US012574987B2

(12) United States Patent
Fan et al.

(10) Patent No.: US 12,574,987 B2
(45) Date of Patent: Mar. 10, 2026

(54) BEAM FAILURE RECOVERY METHOD, APPARATUS, AND SYSTEM

(71) Applicant: HUAWEI TECHNOLOGIES CO., LTD., Shenzhen (CN)

(72) Inventors: Bo Fan, Chengdu (CN); Xi Zhang, Chengdu (CN); Lei Chen, Chengdu (CN); Shitong Yuan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 317 days.

(21) Appl. No.: 18/343,702

(22) Filed: Jun. 28, 2023

(65) Prior Publication Data

US 2023/0345570 A1 Oct. 26, 2023

Related U.S. Application Data

(63) Continuation of application No. PCT/CN2021/071864, filed on Jan. 14, 2021.

(51) Int. Cl.
*H04W 76/19* (2018.01)
*H04B 7/06* (2006.01)

(52) U.S. Cl.
CPC .......... *H04W 76/19* (2018.02); *H04B 7/0695* (2013.01)

(58) Field of Classification Search
CPC ............................. H04W 76/19; H04B 7/0695
See application file for complete search history.

(56) References Cited

U.S. PATENT DOCUMENTS

| | | | |
|---|---|---|---|
| 2020/0383167 A1 | 12/2020 | Sengupta et al. | |
| 2022/0046750 A1* | 2/2022 | Jeon ...................... | H04W 36/06 |
| 2022/0174567 A1* | 6/2022 | Awada ............... | H04B 7/06964 |
| 2022/0345267 A1* | 10/2022 | Zhou ................... | H04B 7/0695 |

(Continued)

FOREIGN PATENT DOCUMENTS

| | | |
|---|---|---|
| CN | 111278166 A | 6/2020 |
| WO | 2020151472 A1 | 7/2020 |
| WO | 2020191751 A1 | 10/2020 |

OTHER PUBLICATIONS

Nokia et al., "Enhancements on Beam Management for Multi-TRP/Panel Transmission", 3GPP TSG RAN WG1 #103-e Meeting R1-2008906, Nov. 13, 2020, total 12 pages.

(Continued)

*Primary Examiner* — Melanie Jagannathan

(57) ABSTRACT

This application provides a beam failure recovery method, an apparatus, and a system. In this solution, a terminal device receives first configuration information from a network device, and performs cell-level beam failure recovery or transmission reception point level (TRP-level) beam failure recovery based on the first configuration information. The first configuration information is used to configure a plurality of sets of beam failure detection resources and a plurality of sets of candidate beam resources. Based on this solution, the terminal device may perform partial beam failure recovery based on the plurality of sets of beam failure detection resources and the plurality of sets of candidate beam resources, so that the terminal device can detect a TRP-level beam failure and recover the TRP-level beam failure in time. This effectively improves smooth system evolution.

19 Claims, 9 Drawing Sheets

| R | Serving cell identifier | | | | | TWP identifier | | Oct1 |
|---|---|---|---|---|---|---|---|---|
| $T_7$ | $T_6$ | $T_5$ | $T_4$ | $T_3$ | $T_2$ | $T_1$ | $T_0$ | Oct2 |
| $T_{15}$ | $T_{14}$ | $T_{13}$ | $T_{12}$ | $T_{11}$ | $T_{10}$ | $T_9$ | $T_8$ | Oct3 |
| $T_{(N-2)*8+7}$ | $T_{(N-2)*8+7}$ | $T_{(N-2)*8+7}$ | $T_{(N-2)*8+7}$ | $T_{(N-2)*8+7}$ | $T_{(N-2)*8+7}$ | $T_{(N-2)*8+7}$ | $T_{(N-2)*8+7}$ | OctM |

| CORESET group index | Serving cell identifier | | | | | TWP identifier | | Oct1 |
|---|---|---|---|---|---|---|---|---|
| $T_7$ | $T_6$ | $T_5$ | $T_4$ | $T_3$ | $T_2$ | $T_1$ | $T_0$ | Oct2 |
| $T_{15}$ | $T_{14}$ | $T_{13}$ | $T_{12}$ | $T_{11}$ | $T_{10}$ | $T_9$ | $T_8$ | Oct3 |
| $T_{(N-2)*8+7}$ | $T_{(N-2)*8+7}$ | $T_{(N-2)*8+7}$ | $T_{(N-2)*8+7}$ | $T_{(N-2)*8+7}$ | $T_{(N-2)*8+7}$ | $T_{(N-2)*8+7}$ | $T_{(N-2)*8+7}$ | OctM |

(56) References Cited

U.S. PATENT DOCUMENTS

| | | | |
|---|---|---|---|
| 2023/0164865 A1* | 5/2023 | Kang | H04B 7/06968 370/329 |
| 2023/0170968 A1* | 6/2023 | Wang | H04B 7/06964 375/262 |
| 2023/0198602 A1* | 6/2023 | Zeineddine | H04B 7/0695 370/329 |
| 2023/0209634 A1* | 6/2023 | Koskela | H04B 7/0695 370/217 |
| 2023/0247707 A1* | 8/2023 | Chen | H04W 76/19 |
| 2023/0254712 A1* | 8/2023 | Li | H04L 5/0048 370/216 |
| 2023/0262820 A1* | 8/2023 | Song | H04W 24/08 370/329 |
| 2023/0276278 A1* | 8/2023 | Loehr | H04B 7/06964 370/329 |
| 2023/0283353 A1* | 9/2023 | Sun | H04W 76/15 375/262 |
| 2023/0353223 A1* | 11/2023 | Jia | H04B 7/06954 |
| 2023/0370146 A1* | 11/2023 | Wang | H04B 7/088 |
| 2023/0397282 A1* | 12/2023 | Thangarasa | H04W 76/19 |
| 2024/0049010 A1* | 2/2024 | Wang | H04W 24/04 |
| 2024/0138014 A1* | 4/2024 | Jung | H04B 7/06964 |
| 2024/0162976 A1* | 5/2024 | Ye | H04B 7/06964 |
| 2025/0106897 A1* | 3/2025 | Wu | H04W 76/15 |
| 2025/0133456 A1* | 4/2025 | You | H04W 36/00838 |
| 2025/0141613 A1* | 5/2025 | Yi | H04L 5/0032 |
| 2025/0287231 A1* | 9/2025 | Yan | H04W 36/085 |

OTHER PUBLICATIONS

Interdigital Inc., "Beam Management Enhancements for Multi-TRP", 3GPP TSG RAN WG1 #103-e R1-2007629, Nov. 13, 2020, total 5 pages.
3GPP TS 38.331 V15.5.0 (Mar. 2019), 3rd Generation Partnership Project; Technical Specification Group Radio Access Network; NR; Radio Resource Control (RRC) protocol specification(Release 15), 491 pages.
3GPP TS 38.211 v15.50:"3rd Generation Partnership Project; Technical Specification Group Radio Access Network; NR; Physical channels and modulation (Release 15)",Mar. 2019,total 96 pages.
3GPP TS 38.212 V15.5.0 (Mar. 2019), 3rd Generation Partnership Project; Technical Specification Group Radio Access Network; NR; Multiplexing and channel coding (Release 15), total 101 pages.
3GPP TS 38.213 V15.5.0 (Mar. 2019), 3rd Generation Partnership Project; Technical Specification Group Radio Access Network; NR; Physical layer procedures for control(Release 15), 104 pages.
3GPP TS 38.214 V15.5.0 (Mar. 2019), 3rd Generation Partnership Project; Technical Specification Group Radio Access Network; NR; Physical layer procedures for data(Release 15), 103 pages.

* cited by examiner

| R | Serving cell identifier | | | | | TWP identifier | | Oct1 |
|---|---|---|---|---|---|---|---|---|
| $T_7$ | $T_6$ | $T_5$ | $T_4$ | $T_3$ | $T_2$ | $T_1$ | $T_0$ | Oct2 |
| $T_{15}$ | $T_{14}$ | $T_{13}$ | $T_{12}$ | $T_{11}$ | $T_{10}$ | $T_9$ | $T_8$ | Oct3 |

$\vdots$

| $T_{(N-2)*8+7}$ | $T_{(N-2)*8+7}$ | $T_{(N-2)*8+7}$ | $T_{(N-2)*8+7}$ | $T_{(N-2)*8+7}$ | $T_{(N-2)*8+7}$ | $T_{(N-2)*8+7}$ | $T_{(N-2)*8+7}$ | OctM |

FIG. 1a

| CORESET group index | Serving cell identifier | | | | TWP identifier | | Oct1 |
|---|---|---|---|---|---|---|---|
| $T_7$ | $T_6$ | $T_5$ | $T_4$ | $T_3$ | $T_2$ | $T_1$ | $T_0$ | Oct2 |
| $T_{15}$ | $T_{14}$ | $T_{13}$ | $T_{12}$ | $T_{11}$ | $T_{10}$ | $T_9$ | $T_8$ | Oct3 |

...

| $T_{(N-2)*8+7}$ | $T_{(N-2)*8+7}$ | $T_{(N-2)*8+7}$ | $T_{(N-2)*8+7}$ | $T_{(N-2)*8+7}$ | $T_{(N-2)*8+7}$ | $T_{(N-2)*8+7}$ | $T_{(N-2)*8+7}$ | OctM |

FIG. 1b

| | | |
|---|---|---|
| R | Serving cell identifier            TWP identifier | Oct1 |
| $C_0$ | TCI state $ID_{0,1}$ | Oct2 |
| R | TCI state $ID_{0,2}$ | Oct3 (Optional) |
| $C_N$ | TCI state $ID_{N,1}$ | OctM–1 |
| R | TCI state $ID_{N,2}$ | OctM (Optional) |

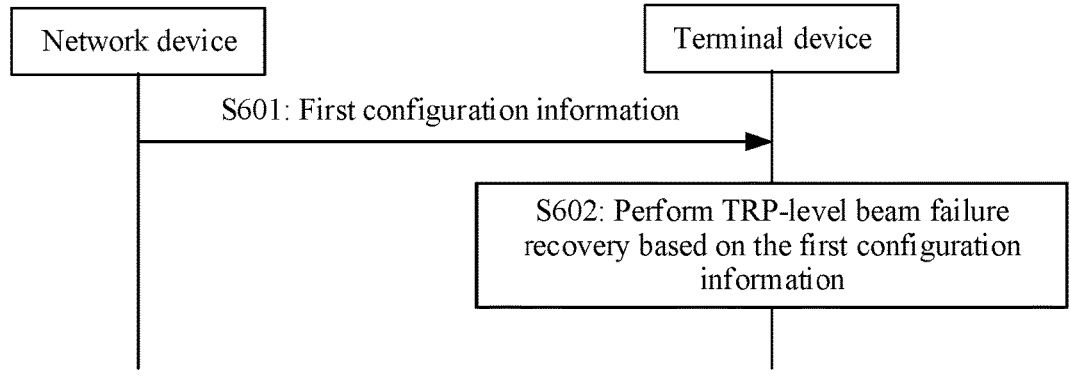

| Network device | | Terminal device |
| --- | --- | --- |
| | S601: First configuration information → | |
| | | S602: Perform TRP-level beam failure recovery based on the first configuration information |

FIG. 6

Network device      Terminal device

Layer-1 entity    Upper-level entity

S601: First configuration information (for configuring N sets of beam failure detection resources and N sets of candidate beam resources)

S6021: Detect quality of beam failure detection resources in the N sets of beam failure detection resources S6022: Beam failure indication information

S602

S6023a: First indication information

S6024: Beam failure recovery response information

S6023b: Fourth indication information

FIG. 7

BEAM FAILURE RECOVERY METHOD, APPARATUS, AND SYSTEM

CROSS-REFERENCE TO RELATED APPLICATIONS

This application is a continuation of International Application No. PCT/CN2021/071864, filed on Jan. 14, 2021, the disclosure of which is hereby incorporated by reference in its entirety.

TECHNICAL FIELD

This application relates to the communication field, and in particular, to a beam failure recovery method, an apparatus, and a system.

BACKGROUND

A main problem for high-frequency communication is that signal energy sharply decreases as a transmission distance increases, and this results in a short signal transmission distance. To overcome this problem, an analog beam technology is used for high-frequency communication to concentrate the signal energy within a small angle range, to form a light beam-like signal (referred to as an analog beam, a beam for short), so as to improve a transmission distance. However, as a signal coverage area of the analog beam is narrow, a beam failure (beam failure) may occur because the analog beam is easily blocked by obstacles.

In view of the foregoing problems, release (Rel) 15 of a fifth generation (5G) system provides a cell-level beam failure recovery (BFR) process.

However, a network device may send a beam to a terminal device in a cell using a plurality of transmission reception points (TRP) jointly. In this scenario, how to perform beam failure recovery is an urgent problem to be resolved currently.

SUMMARY

This application provides a beam failure recovery method, an apparatus, and a system, to perform partial beam failure recovery in time. In addition, TRP-level beam failure recovery and cell-level beam failure recovery can be compatible with each other, and this effectively improves smooth system evolution.

To achieve the foregoing objective, this application provides the following technical solutions.

According to a first aspect, a beam failure recovery method is provided. The method may be performed by a terminal device, or may be performed by a component of a terminal device, for example, a processor, a chip, or a chip system of the terminal device. An example in which the terminal device performs the method is used for description in this application. The method includes: A terminal device receives first configuration information from a network device, and performs cell-level beam failure recovery or TRP-level beam failure recovery based on the first configuration information, where the first configuration information is used to configure N sets of beam failure detection resources and N sets of candidate beam resources, and N is a positive integer greater than 1.

Based on this solution, the network device configures the N sets of beam failure detection resources and the N sets of candidate beam resources, and the terminal device may perform TRP-level beam failure recovery or perform partial beam failure recovery based on the N sets of beam failure detection resources and the N sets of candidate beam resources. In this way, the terminal device can detect a partial beam failure and perform partial beam failure recovery in time. When the N sets of beam failure detection resources are per-TRP configured, TRP-level beam failure recovery can be implemented, so as to improve performance of multi-TRP transmission. In addition, the terminal device may perform cell-level beam failure recovery based on the N sets of beam failure detection resources and the N sets of candidate beam resources. In this way, both the TRP-level beam failure recovery and the cell-level beam failure recovery are supported. In other words, the TRP-level beam failure recovery and the cell-level beam failure recovery can be compatible. This effectively improves smooth system evolution.

In some possible designs, that the terminal device performs cell-level beam failure recovery based on the first configuration information includes: When quality of all beam failure detection resources in the N sets of beam failure detection resources configured in the first configuration information is less than a first threshold, the terminal device sends first indication information to the network device, where the first indication information indicates a first beam corresponding to a first candidate beam resource, and the first candidate beam resource is a candidate beam resource whose quality is greater than a second threshold in candidate beam resources included in the N sets of candidate beam resources configured in the first configuration information.

In some possible designs, the beam failure recovery method further includes: The terminal device receives second configuration information from the network device, where the second configuration information is used to configure one set of beam failure detection resources and one set of candidate beam resources. Performing cell-level beam failure recovery based on the first configuration information includes: When quality of all beam failure detection resources in the one set of beam failure detection resources configured in the second configuration information and in the N sets of beam failure detection resources configured in the first configuration information is less than a first threshold, the terminal device sends first indication information to the network device, where the first indication information indicates a first beam corresponding to a first candidate beam resource, and the first candidate beam resource is a candidate beam resource whose quality is greater than a second threshold in candidate beam resources included in one set of candidate beam resources configured in the second configuration information or the N sets of candidate beam resources configured in the first configuration information.

In some possible designs, that the terminal device performs TRP-level beam failure recovery based on the first configuration information includes: When quality of all beam failure detection resources in a first set of beam failure detection resources is less than a first threshold, the terminal device sends first indication information to the network device, where the first indication information indicates a first beam corresponding to a first candidate beam resource, and the first candidate beam resource is a candidate beam resource whose quality is greater than a second threshold in a first set of candidate beam resources. The first set of beam failure detection resources is one of the N sets of beam failure detection resources configured in the first configuration information, and the set of candidate beam resources is a set of candidate beam resources that is associated with the first set of beam failure detection resources in the N sets of candidate beam resources configured in the first configuration information.

Based on three possible designs, when a beam failure occurs, the terminal device reports, to the network device, the first beam corresponding to the candidate beam resource whose quality is greater than the second threshold in the set of candidate beam resources, so that the network device can send data over the first beam, to improve service continuity and reduce a service delay.

In some possible designs, the terminal device detects the quality of the beam failure detection resources included in the N sets of beam failure detection resources configured in the first configuration information. When all beam failure detection resources in a single set of beam failure detection resources are less than the first threshold, the terminal device determines that the TRP-level beam failure or the partial beam failure occurs, and then performs TRP-level beam failure recovery based on the first configuration information. When the quality of all the beam failure detection resources in the N sets of beam failure detection resources is less than the first threshold, if the terminal device further receives the second configuration information, when the quality of all the beam failure detection resources in the one set of beam failure detection resources configured in the second configuration information is less than the first threshold, the terminal device determines that the cell-level beam failure occurs, and then performs cell-level beam failure recovery based on the first configuration information and the second configuration information. When the quality of all the beam failure detection resources in the N sets of beam failure detection resources is less than the first threshold, if the terminal device does not receive the second configuration information, the terminal device may determine that the cell-level beam failure occurs, and then perform cell-level beam failure recovery based on the first configuration information and the second configuration information.

According to a second aspect, a beam failure recovery method is provided. The method may be performed by a terminal device, or may be performed by a component of a terminal device, for example, a processor, a chip, or a chip system of the terminal device. An example in which the terminal device performs the method is used for description in this application. The method includes: The terminal device receives first configuration information from a network device, where the first configuration information is used to configure N sets of beam failure detection resources and N sets of candidate beam resources, and N is a positive integer greater than 1; and when quality of all beam failure detection resources in a first set of beam failure detection resources is less than a first threshold, the terminal device sends first indication information to the network device, where the first indication information indicates a first beam corresponding to a first candidate beam resource, and the first candidate beam resource is a candidate beam resource whose quality is greater than a second threshold in a set of candidate beam resources. The first set of beam failure detection resources is one of the N sets of beam failure detection resources, and the set of candidate beam resources is a set of candidate beam resources that is associated with the first set of beam failure detection resources in the N sets of candidate beam resources.

Based on this solution, in one aspect, when determining that a beam failure occurs in any set of beam failure detection resources, the terminal device determines, from a set of candidate beam resources associated with the set of beam failure detection resources, a candidate beam resource whose quality is higher than the second threshold, and sends the first indication information to the network device to perform beam failure recovery. Therefore, the terminal device does not need to perform beam failure recovery only when a beam failure occurs in all the N sets of beam failure detection resources. In addition, because each set of beam failure detection resources in the N sets of beam failure detection resources is associated with a set of candidate beam resources in the N sets of candidate beam resources, recovery may be performed for each set of beam failure detection resources. In conclusion, according to the beam failure recovery method provided in this application, the partial beam failure can be detected in time, and the partial beam failure recovery can be performed in time. When the N sets of beam failure detection resources are per-TRP configured, TRP-level beam failure recovery can be implemented. This improves performance of multi-TRP transmission.

With reference to the first aspect or the second aspect, in some possible designs, that the terminal device sends first indication information to the network device includes: The terminal device sends a scheduling request SR to the network device over a first transmit beam of N transmit beams on a first physical uplink control channel (PUCCH), where the SR is used to request the network device to schedule an uplink transmission resource. Then, the terminal device sends a medium access control-control element (MAC CE) to the network device on the uplink transmission resource scheduled by the network device, where the MAC CE includes the first indication information. The first transmit beam is associated with a second set of beam failure detection resources, a second set of candidate beam resources, or a fourth control resource set (CORESET) group. The second set of beam failure detection resources is a set of beam failure detection resources that is different from the first set of beam failure detection resources in the N sets of beam failure detection resources, the second set of candidate beam resources is associated with the second set of beam failure detection resources, and the fourth CORESET group is a CORESET group corresponding to the second set of beam failure detection resources.

With reference to the first aspect or the second aspect, in some possible designs, the beam failure recovery method further includes: A layer-1 entity of the terminal device sends beam failure indication information to an upper-layer entity of the terminal device, where the beam failure indication information includes: information about a set of beam failure detection resources in which a beam failure occurs, and/or a beam failure type, where the beam failure type includes a cell-level beam failure or a TRP-level beam failure; and quality of all beam failure detection resources in the set of beam failure detection resources in which the beam failure occurs is less than the first threshold.

With reference to the first aspect or the second aspect, in some possible designs, the first beam and a second beam meet a first relationship.

Based on this possible design, the first beam indicated by the first indication information and the second beam definitely meet the first relationship, that is, the first beam and the second beam can be simultaneously transmitted, and even if the network device simultaneously sends the first beam and the second beam, the terminal device can simultaneously receive the first beam and the second beam. This reduces a probability of a transmission error, and improves transmission efficiency.

With reference to the first aspect or the second aspect, in some possible designs, the beam failure recovery method further includes: The terminal device sends second indication information to the network device, where the second indication information indicates whether the first beam and a second beam meet a first relationship.

Based on this possible design, the terminal device indicates, to the network device, whether the first beam and the second beam meet the first relationship, so that the network device can determine, based on the indication of the terminal device, whether to simultaneously send the first beam and the second beam. For example, when the first beam and the second beam meet the first relationship, the network device simultaneously sends the first beam and the second beam. When the first beam and the second beam do not meet the first relationship, the network device asynchronously sends the first beam and the second beam. This reduces a probability of a transmission error and improves transmission efficiency.

With reference to the first aspect or the second aspect, in some possible designs, the beam failure recovery method further includes: The terminal device sends third indication information to the network device, where the third indication information indicates information about a second beam that meets a first relationship with the first beam.

Based on this possible design, the terminal device sends, to the network device, the information about the second beam that meets the first relationship with the first beam, so that the network device can simultaneously send the first beam and the second beam, and asynchronously send the first beam and another beam other than the second beam. This reduces a probability of a transmission error and improves transmission efficiency.

With reference to the first aspect or the second aspect, in some possible designs, the beam failure recovery method further includes: The terminal device determines, based on third configuration information, whether the first beam and the second beam need to meet the first relationship, where the third configuration information includes one or more of the following: relationship configuration information, multi-TRP transmission mode configuration information, or beam measurement configuration information.

With reference to the first aspect or the second aspect, in some possible designs, when the third configuration information is the multi-TRP transmission mode configuration information, that the terminal device determines, based on the multi-TRP transmission mode configuration information, whether the first beam and the second beam need to meet the first relationship includes: When a transmission mode configured in the multi-TRP transmission mode configuration information is a frequency division multiplexing (FDM) mode, the terminal device determines that the first beam and the second beam need to meet the first relationship, or when a transmission mode configured in the multi-TRP transmission mode configuration information is not an FDM mode, the terminal device determines that the first beam and the second beam do not need to meet the first relationship.

With reference to the first aspect or the second aspect, in some possible designs, when the third configuration information is the relationship configuration information, that the terminal device determines, based on the relationship configuration information, whether the first beam and the second beam need to meet the first relationship includes: When the relationship configuration information indicates that the first beam and the second beam need to meet the first relationship, the terminal device determines that the first beam and the second beam need to meet the first relationship; or when the relationship configuration information indicates that the first beam and the second beam do not meet the first relationship, the terminal device determines that the first beam and the second beam do not need to meet the first relationship.

With reference to the first aspect or the second aspect, in some possible designs, when the third configuration information is the beam measurement configuration information, that the terminal device determines, based on the beam measurement configuration information, whether the first beam and the second beam need to meet the first relationship includes: When a first parameter of the beam measurement configuration information is configured to be enabled, the terminal device determines that the first beam and the second beam need to meet the first relationship; or when a first parameter of the beam measurement configuration information is configured to be disabled, the terminal device determines that the first beam and the second beam do not need to meet the first relationship, where the first parameter is used to configure whether to perform grouping reporting.

With reference to the first aspect or the second aspect, in some possible designs, the beam failure recovery method further includes: The terminal device uses the first beam as a common beam of a TRP corresponding to a first CORESET group, or uses the first beam as a transmit beam of one or more of the following: a physical downlink control channel (PDCCH) corresponding to the first CORESET group, a physical downlink shared channel (PDSCH) corresponding to the first CORESET group, a PUCCH corresponding to the first CORESET group, and a physical uplink shared channel PUSCH corresponding to the first CORESET group. A part of or all quasi co-location (QCL) resources corresponding to the first CORESET group form the first set of beam failure detection resources, or any CORESET in the first CORESET group has a QCL relationship with a beam failure detection resource in the first set of beam failure detection resources.

With reference to the first aspect or the second aspect, in some possible designs, the beam failure recovery method further includes: sending terminal capability information to the network device, where the terminal capability information includes one or more of the following: information that the terminal device supports the TRP-level beam failure recovery, information that the terminal device supports configuration of a plurality of sets of beam failure detection resources, information about a quantity of sets of beam failure detection resources of which the terminal device supports configuration, information about a quantity of beam failure detection resources in a single set of beam failure detection resources, information that the terminal device supports configuration of a plurality of sets of candidate beam resources, information about a quantity of sets of candidate beam resources of which the terminal device supports configuration, or information about a quantity of candidate beam resources in a single set of candidate beam resources.

Based on this possible design, the terminal device reports the capability information of the terminal device to the network device, so that the network device can learn whether the terminal device supports some functions, for example, whether the terminal device supports TRP-level beam failure recovery; or the network device can learn value information about some parameters, for example, a quantity of beam failure detection resources in the set of beam failure detection resources, or the like. In this way, the network device can perform proper parameter configuration based on the capability information, to improve reasonableness of a beam failure recovery configuration.

According to a third aspect, a beam failure recovery method is provided. The method may be performed by a network device, or may be performed by a component of a network device, for example, a processor, a chip, or a chip system of the network device. An example in which the network device performs the method is used for description in this application. The method includes: A network device generates and sends first configuration information to a terminal device, where the first configuration information is used to configure N sets of beam failure detection resources and N sets of candidate beam resources, and N is a positive integer greater than 1.

Based on this solution, the network device configures the N sets of beam failure detection resources and the N sets of candidate beam resources for the terminal device, and the terminal device can perform TRP-level beam failure recovery or perform partial beam failure recovery based on the N sets of beam failure detection resources and the N sets of candidate beam resources. In this way, the terminal device can detect a partial beam failure and perform partial beam failure recovery in time. When the N sets of beam failure detection resources are per-TRP configured, TRP-level beam failure recovery can be implemented, so as to improve performance of multi-TRP transmission. In addition, the terminal device may perform cell-level beam failure recovery based on the N sets of beam failure detection resources and the N sets of candidate beam resources. In this way, the TRP-level beam failure recovery and the cell-level beam failure recovery are simultaneously supported. In other words, the TRP-level beam failure recovery and the cell-level beam failure recovery can be compatible. This effectively improves smooth system evolution.

In some possible designs, the beam failure recovery method further includes: The network device receives first indication information from the terminal device, where the first indication information indicates a first beam corresponding to a first candidate beam resource, and the first candidate beam resource is a candidate beam resource whose quality is greater than a second threshold in candidate beam resources included in the N sets of candidate beam resources configured in the first configuration information.

In some possible designs, the beam failure recovery method further includes: The network device sends second configuration information to the terminal device. The beam failure recovery method further includes: The network device receives first indication information from the terminal device, where the first indication information indicates a first beam corresponding to a first candidate beam resource; and the first candidate beam resource is a candidate beam resource whose quality is greater than a second threshold in candidate beam resources included in the one set of candidate beam resources or the N sets of candidate beam resources.

In some possible designs, the beam failure recovery method further includes: The network device receives first indication information from the terminal device, where the first indication information indicates a first beam corresponding to a first candidate beam resource, and the first candidate beam resource is a candidate beam resource whose quality is greater than a second threshold in a first set of candidate beam resources, where the set of candidate beam resources is a set of candidate beam resources that is associated with the first set of beam failure detection resources in the N sets of candidate beam resources, and the first set of beam failure detection resources is one of the N sets of beam failure detection resources.

In some possible designs, the beam failure recovery method further includes: The network device receives second indication information from the terminal device, where the second indication information indicates whether the first beam and a second beam meet a first relationship.

In some possible designs, the beam failure recovery method further includes: The network device receives third indication information from the terminal device, where the third indication information indicates information about a second beam that meets a first relationship with the first beam.

In some possible designs, the beam failure recovery method further includes: The network device receives terminal capability information from the terminal device, where the terminal capability information includes one or more of the following: information that the terminal device supports the TRP-level beam failure recovery, information that the terminal device supports configuration of a plurality of sets of beam failure detection resources, information about a quantity of sets of beam failure detection resources of which the terminal device supports configuration, information about a quantity of beam failure detection resources in a single set of beam failure detection resources, information that the terminal device supports configuration of a plurality of sets of candidate beam resources, information about a quantity of sets of candidate beam resources of which the terminal device supports configuration, or information about a quantity of candidate beam resources in a single set of candidate beam resources.

With reference to the first aspect, the second aspect, or the third aspect, in some possible designs, the first relationship includes the following: The first beam and the second beam can be simultaneously received by the terminal device, receive beams corresponding to the first beam and the second beam are the same, or receive antenna panels corresponding to the first beam and the second beam are different.

With reference to the first aspect, the second aspect, or the third aspect, in some possible designs, the second beam is a beam corresponding to one or more beam failure detection resources in the second set of beam failure detection resources.

Alternatively, the second beam is a PDCCH transmit beam corresponding to a second CORESET group, and the second CORESET group corresponds to the second set of beam failure detection resources.

Alternatively, the second beam is a PDSCH transmit beam of a TRP corresponding to the second set of beam failure detection resources.

Alternatively, the second beam is a common beam of a TRP corresponding to the second set of beam failure detection resources.

The second set of beam failure detection resources is a set of beam failure detection resources that is different from the first set of beam failure detection resources in the N sets of beam failure detection resources.

With reference to the first aspect, the second aspect, or the third aspect, in some possible designs, the first configuration information includes N sets of beam failure detection resources; a quantity of beam failure detection resources included in each of the N sets of beam failure detection resources does not exceed M, or a total quantity of beam failure detection resources included in the N sets of beam failure detection resources does not exceed P; and M and P are positive integers.

With reference to the first aspect, the second aspect, or the third aspect, in some possible designs, a value of N is 2, a value of M is 1 or 2, and a value of P is one of 2, 3, or 4.

Based on the foregoing two possible designs, a quantity of beam failure detection resources is limited, so that the network device can be prevented from configuring a large quantity of beam failure detection resources to the terminal device. This reduces resource overheads.

With reference to the first aspect, the second aspect, or the third aspect, in some possible designs, the configuration information includes N CORESET groups, and each of the N CORESET groups is for determining one set of beam failure detection resources in the N sets of beam failure detection resources.

With reference to the first aspect, the second aspect, or the third aspect, in some possible designs, the N CORESET groups include a third CORESET group, QCL resources of K CORESETs in the third CORESET group form a third set of beam failure detection resources in the N sets of beam failure detection resources, and K is a positive integer. For example, a value of K is 1 or 2.

Based on the foregoing two possible designs, a quantity of QCL resources that are of CORESETs and that are used as beam failure detection resources is limited, so that the network device can be prevented from configuring a large quantity of beam failure detection resources to the terminal device. This reduces resource overheads.

With reference to the first aspect, the second aspect, or the third aspect, in some possible designs, the K CORESETs are K CORESETs with smallest indexes, K CORESETs with largest indexes, first K CORESETs, last K CORESETs, or K CORESETs with corresponding minimum periods in the third CORESET group.

With reference to the first aspect, the second aspect, or the third aspect, in some possible designs, the K CORESETs are top K CORESETs in the third CORESET group, CORESETs in the third CORESET group are sorted in ascending order of corresponding periods, and when periods corresponding to a plurality of CORESETs are the same, the plurality of CORESETs are sorted based on index sizes or a configuration sequence.

With reference to the first aspect, the second aspect, or the third aspect, in some possible designs, the first configuration information includes N1 CORESET groups and N2 sets of beam failure detection resources in the N sets of beam failure detection resources. Each of the N1 CORESET groups is separately for determining one set of beam failure detection resources in the N sets of beam failure detection resources, and a sum of N1 and N2 is equal to N.

Based on the foregoing possible design, this application provides a plurality of configuration manners of the N sets of beam failure detection resources. This improves flexibility of the solution.

According to a fourth aspect, a communication apparatus is provided, to implement the foregoing method. The communication apparatus may be the terminal device in the first aspect or the second aspect, or an apparatus including the terminal device, or an apparatus included in the terminal device, for example, a chip. Alternatively, the communication apparatus may be the network device in the third aspect, or an apparatus including the network device, or an apparatus included in the network device, for example, a chip. The communication apparatus includes a corresponding module, unit, or means (means) for implementing the foregoing method. The module, unit, or means may be implemented by hardware, software, or hardware executing corresponding software. The hardware or the software includes one or more modules or units corresponding to the foregoing functions.

In some possible designs, the communication apparatus may include a processing module and a transceiver module. The transceiver module may also be referred to as a transceiver unit, and is configured to implement a sending function and/or a receiving function in any one of the foregoing aspects and any one of the possible implementations of the foregoing aspects. The transceiver module may include a transceiver circuit, a transceiver machine, a transceiver, or a communication interface. The processing module may be configured to implement a processing function in any one of the foregoing aspects and any one of the possible implementations of the foregoing aspects.

In some possible designs, the transceiver module includes a sending module and a receiving module, respectively configured to implement the sending function and the receiving function in any one of the foregoing aspects and any one of the possible implementations of the foregoing aspects.

The communication apparatus provided in the fourth aspect is configured to perform any one of the foregoing aspects or any one of the possible implementations of the foregoing aspects. For specific details, refer to any one of the foregoing aspects or any one of the possible implementations of the foregoing aspects. Details are not described herein again.

According to a fifth aspect, a communication apparatus is provided, and includes a processor and a memory. The memory is configured to store computer instructions, and when the processor executes the instructions, the communication apparatus is enabled to perform the method according to any one of the foregoing aspects. The communication apparatus may be the terminal device in the first aspect or the second aspect, or an apparatus including the terminal device, or an apparatus included in the terminal device, for example, a chip. Alternatively, the communication apparatus may be the network device in the third aspect, or an apparatus including the network device, or an apparatus included in the network device, for example, a chip.

According to a sixth aspect, a communication apparatus is provided, including a processor and a communication interface. The communication interface is configured to communicate with a module other than the communication apparatus, and the processor is configured to execute a computer program or instructions, so that the communication apparatus performs the method in any one of the foregoing aspects. The communication apparatus may be the terminal device in the first aspect or the second aspect, or an apparatus including the terminal device, or an apparatus included in the terminal device, for example, a chip. Alternatively, the communication apparatus may be the network device in the third aspect, or an apparatus including the network device, or an apparatus included in the network device, for example, a chip.

According to a seventh aspect, a communication apparatus is provided, including an interface circuit and a logic circuit. The interface circuit is configured to obtain input information and/or output information. The logic circuit is configured to perform the method in any one of the foregoing aspects or any one of the possible implementations of any one of the foregoing aspects, to process and/or generate the output information based on the input information. The communication apparatus may be the terminal device in the first aspect or the second aspect, or an apparatus including the terminal device, or an apparatus included in the terminal device, for example, a chip. Alternatively, the communication apparatus may be the network device in the third aspect, or an apparatus including the network device, or an apparatus included in the network device, for example, a chip.

When the communication apparatus is the terminal device in the first aspect or the second aspect, or the apparatus including the terminal device, or the apparatus included in the terminal device, the input information may be as follows.

In some possible designs, the input information may be first configuration information, and the first configuration information is used to configure N sets of beam failure detection resources and N sets of candidate beam resources. Correspondingly, performing processing based on the input information may be: performing cell-level beam failure recovery or TRP-level beam failure recovery based on the first configuration information.

In some possible designs, the output information may be first indication information, and the first indication information indicates a beam corresponding to a first candidate beam resource.

In some possible designs, the output information may be second indication information, and the second indication information indicates whether a first beam and a second beam meet a first relationship.

In some possible designs, the output information may be third indication information, and the third indication information indicates information about a second beam that meets a first relationship with the first beam.

In some possible designs, the output information may be terminal capability information, and the terminal capability information includes one or more of the following: information that the terminal device supports the TRP-level beam failure recovery, information that the terminal device supports configuration of a plurality of sets of beam failure detection resources, information about a quantity of sets of beam failure detection resources of which the terminal device supports configuration, information about a quantity of beam failure detection resources in a single set of beam failure detection resources, information that the terminal device supports configuration of a plurality of sets of candidate beam resources, information about a quantity of sets of candidate beam resources of which the terminal device supports configuration, or information about a quantity of candidate beam resources in a single set of candidate beam resources.

According to an eighth aspect, a communication apparatus is provided. The communication apparatus includes at least one processor. The processor is configured to execute a computer program or instructions stored in a memory, so that the communication apparatus performs the method in any one of the foregoing aspects. The memory may be coupled to the processor, or may be independent of the processor. The communication apparatus may be the terminal device in the first aspect or the second aspect, or an apparatus including the terminal device, or an apparatus included in the terminal device, for example, a chip. Alternatively, the communication apparatus may be the network device in the third aspect, or an apparatus including the network device, or an apparatus included in the network device, for example, a chip.

According to a ninth aspect, a computer-readable storage medium is provided. The computer-readable storage medium stores instructions, and when the instructions are run on a communication apparatus, the communication apparatus is enabled to perform the method in any one of the foregoing aspects.

According to a tenth aspect, a computer program product including instructions is provided. When the computer program product is run on a communication apparatus, the communication apparatus is enabled to perform the method in any one of the foregoing aspects.

According to an eleventh aspect, a communication apparatus (for example, the communication apparatus may be a chip or a chip system) is provided. The communication apparatus includes a processor, configured to implement a function in any one of the foregoing aspects.

In some possible designs, the communication apparatus includes the memory, and the memory is configured to store necessary program instructions and data.

In some possible designs, when the apparatus is a chip system, the apparatus may include a chip, or may include a chip and another discrete component.

It may be understood that when the communication apparatus provided in any one of the fourth aspect to the eleventh aspect is the chip, the foregoing sending action/function may be understood as the output information, and the foregoing receiving action/function may be understood as the input information.

For a technical effect brought by any design manner in the fourth aspect to the eleventh aspect, refer to technical effects brought by different design manners in the first aspect, the second aspect, or the third aspect. Details are not described herein again.

According to a twelfth aspect, a communication system is provided. The communication system includes the network device and the terminal device in the foregoing method designs.

BRIEF DESCRIPTION OF DRAWINGS

FIG. 1a is a schematic diagram of a structure of a MAC CE according to this application;

FIG. 1b is a schematic diagram of a structure of another MAC CE according to this application;

FIG. 6 is a schematic flowchart of a beam failure recovery method according to this application;

FIG. 7 is a schematic flowchart of another beam failure recovery method according to this application;

DESCRIPTION OF EMBODIMENTS

Figure 1C:
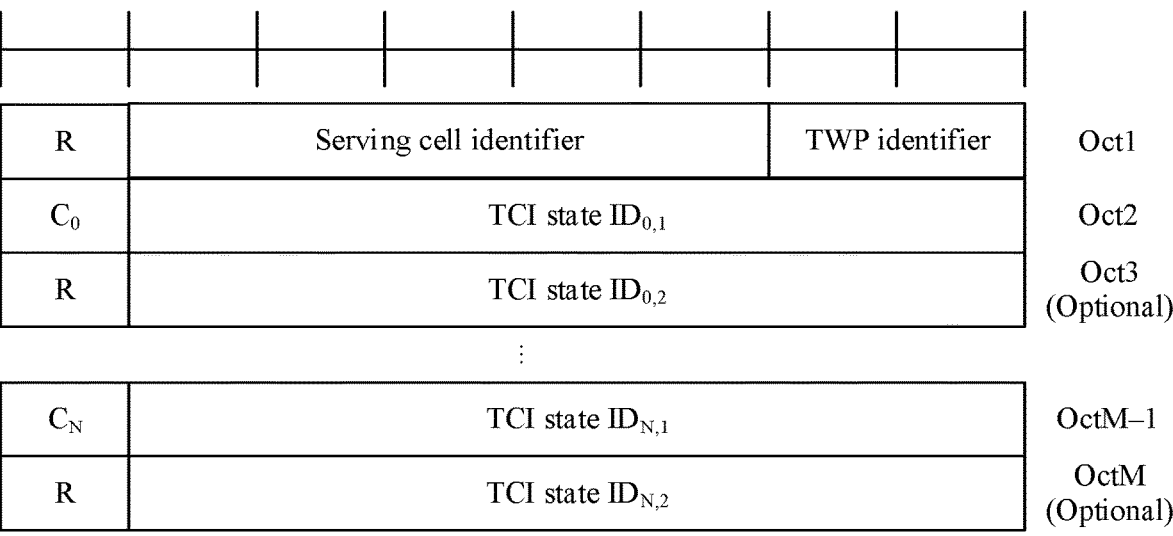
FIG. 1c is a schematic diagram of a structure of still another MAC CE according to this application.

For ease of understanding solutions in embodiments of this application, brief descriptions or definitions of related technologies are first provided as follows:

13
1. Beam

The beam is a communication resource. In a new radio (NR) protocol, the beam may be referred to as a spatial domain filter (spatial domain filter), or referred to as a spatial filter (spatial filter), or referred to as a spatial domain parameter (spatial domain parameter), a spatial parameter (spatial parameter), a spatial domain setting (spatial domain setting), a spatial setting (spatial setting), quasi co-location (QCL) information, a QCL assumption, a QCL indication, or the like. The beam may be indicated via a transmission configuration indication (TCI) state (TCI-state) parameter, or may be indicated via a spatial relation (spatial relation) parameter. Therefore, in this application, the beam may be replaced with the spatial domain filter, the spatial filter, the spatial domain parameter, the spatial parameter, the spatial domain setting, the spatial setting, the QCL information, the QCL assumption, the QCL indication, a TCI-state (for example, a downlink (DL) TCI-state or an uplink (UL) TCI-state), a spatial relation, or the like. The foregoing terms are also equivalent to each other. In this application, the beam may alternatively be replaced with another term for representing a beam. This is not limited in this application.

A beam for sending a signal may be referred to as a transmit beam (Tx beam), or may be referred to as a spatial domain transmission filter (spatial domain transmission filter), a spatial transmission filter (spatial transmission filter), a spatial domain transmission parameter (spatial domain transmission parameter), a spatial transmission parameter (spatial transmission parameter), a spatial domain transmission setting (spatial domain transmission setting), or a spatial transmission setting (spatial transmission setting). A downlink transmit beam may be indicated by the TCI-state.

A beam for receiving a signal may be referred to as a receive beam (Rx beam), or may be referred to as a spatial domain reception filter (spatial domain reception filter), a spatial reception filter (spatial reception filter), a spatial domain reception parameter (spatial domain reception parameter), a spatial reception parameter (spatial reception parameter), a spatial domain reception setting (spatial domain reception setting), or a spatial reception setting (spatial reception setting). An uplink transmit beam may be indicated by the spatial relation (spatial relation), an uplink TCI-state, or a sounding reference signal (SRS) resource (indicating a transmit beam using this SRS). Therefore, an uplink beam may also be replaced with the SRS resource.

The transmit beam may refer to distribution of signal strength formed in different directions in space after a signal is transmitted through an antenna, and the receive beam may refer to distribution of signal strength in different directions in space of a radio signal received from an antenna.

In addition, the beam may be a wide beam, a narrow beam, or a beam of another type. A technology for forming the beam may be a beamforming technology or another technology. The beamforming technology may be a digital beamforming technology, an analog beamforming technology, a hybrid digital/analog beamforming technology, or the like The beam usually corresponds to a resource. For example, when beam measurement is performed, the network device measures different beams through different resources. The terminal device feeds back measured resource quality, and the network device may learn of quality of the beam corresponding to the resource. During data transmission, beam information is also indicated by a resource corresponding to the beam information. For example, the network device indicates information about a physical downlink shared channel (PDSCH) beam of the terminal device by using a TCI field in downlink control information (DCI).

Optionally, a plurality of beams that have same or similar communication features may be considered as one beam. One beam may include one or more antenna ports, and is for transmitting a data channel, a control channel, a sounding signal, and the like. The one or more antenna ports forming the beam may also be considered as one antenna port set.

In embodiments of this application, unless otherwise specified, the beam is a transmit beam of the network device. During beam measurement, each beam of the network device corresponds to one resource. Therefore, a resource index may be used to uniquely identify a beam corresponding to the resource.

2. QCL Relationship

The QCL relationship indicates that a plurality of antenna ports (or resources) have one or more same or similar communication features. A same or similar communication configuration may be used for a plurality of antenna ports (or resources) that have the QCL relationship.

Specifically, if two antenna ports have a QCL relationship, a large-scale property of a channel for transmitting a symbol on one antenna port may be inferred from a large-scale property of a channel for transmitting a symbol on the other antenna port. In other words, the antenna ports having the QCL relationship have the same large-scale property, or a large-scale property of one antenna port may be for determining a large-scale property of another antenna port having a QCL relationship with the antenna port, or a large-scale property difference between two antenna ports is less than a threshold.

The large-scale property may include one or more of the following: a delay spread (delay spread), a Doppler spread (Doppler spread), a Doppler shift (Doppler shift), an average delay (average delay), an average gain, and a spatial receive parameter (spatial Rx parameters). The spatial receive parameter may include one or more of the following: an angle of arrival (AOA), an average AOA, an AOA spread, an angle of departure (AOD), an average AOD, an AOD spread, a receive antenna spatial correlation parameter, a transmit antenna spatial correlation parameter, a transmit beam, a receive beam, and a resource indicator.

The foregoing angles may be decomposition values at different dimensions or a combination of decomposition values at different dimensions. The antenna ports are antenna ports having different antenna port numbers, antenna ports that have a same antenna port number and that are used to send or receive information at different time, on different frequencies, and/or on different code domain resources, and/or antenna ports that have different antenna port numbers and that are used to send or receive information at different time, on different frequencies, and/or on different code domain resources. The resource identifier may include a channel state information reference signal (CSI-RS) resource identifier, a sounding reference signal (SRS) resource identifier, a synchronization signal block (SSB) resource identifier, a resource identifier of a preamble sequence transmitted on a physical random access channel (PRACH), or a resource identifier of a demodulation reference signal (DMRS), and is used to indicate a beam on a resource.

In an NR protocol, the QCL relationship may be classified into the following four types based on different parameters:

type A (type A): a Doppler shift, a Doppler spread, an average delay, and a delay spread;

type B (type B): the Doppler shift and the Doppler spread;

type C (type C): the Doppler shift and the average delay; and type D (type D): a spatial receive parameter.

A QCL whose type is A or B indicates channel estimation information. A QCL whose type is C indicates measurement information such as reference signal received power (reference signal received power). A QCL whose type is D indicates different beams.

It may be understood that, because a reference signal corresponding to an antenna port defines the antenna port, that two antenna ports have a QCL relationship may alternatively be understood as follows: Two reference signals defining the two antenna ports have the QCL relationship.

3. Transmission Configuration Indicator (Transmission Configuration Indicator, TCI) State (State)

A network device may generate different beams that point to different transmission directions. During downlink data transmission, when sending data to the terminal device over a specific beam, the network device needs to notify the terminal device of information about a transmit beam used by the network device. In this way, the terminal device can receive, over a receive beam corresponding to the transmit beam, the data sent by the network device. In a 3rd generation partnership project (3GPP) R15/R16 protocol, the network device indicates, to the terminal device by using a TCI field in DCI, related information of a transmit beam used by the network device. Specifically, a size of the TCI field is 3 bits, and may indicate eight different field values (codepoint), and the eight values of the TCI field indicate different TCI-states or TCI-state groups. The TCI-state includes several parameters, and the related information of the transmit beam may be determined based on these parameters.

The TCI-state is configured by the network device for each terminal device. A format of a TCI-state information element is as follows:

```
TCI-State ::=          SEQUENCE {
  tci-StateId             TCI-StateId,
  qcl-Type1               QCL-Info,
  qcl-Type2               QCL-Info   OPTIONAL,   -- Need R
  ...
}
QCL-Info ::=           SEQUENCE {
  cell                  ServCellIndex   OPTIONAL, -- Need R
  bwp-Id                BWP-Id   OPTIONAL, -- Cond CSI-RS-Indicat
  referenceSignal       CHOICE {
    csi-rs                    NZP-CSI-RS-ResourceId,
    ssb                       SSB-Index
  },
  qcl-Type              ENUMERATED {typeA, typeB, typeC, typeD},
  ...
}
```

Each TCI-state includes a TCI-state index, namely, tci-StateId, and two pieces of QCL-Info. Each piece of QCL-Info includes a cell field and a bwp-Id that respectively indicate a specific bandwidth part (BWP) of a specific cell (cell) to which the QCL-Info is applied. That is, different QCL-Info can be configured for different BWPs of different cells or a same cell. The QCL-Info further includes a reference signal (reference signal) for indicating a specific reference signal resource with which a QCL relationship is formed.

In the R15/R16 protocol, the term "beam" is usually not directly used, and the beam is usually replaced with another term. For example, in both data transmission and channel measurement, the beam corresponds to a reference signal resource, and one beam corresponds to one reference signal resource. Therefore, "a specific reference signal resource with which a QCL relationship is formed" herein essentially means "a specific beam with which a QCL relationship is formed". A maximum of one of the two pieces of QCL-Info included in the TCI-state can be of typeD.

The following uses an example to describe in detail how the network device indicates receive beam information of a data transmit beam to the terminal device via the TCI-state according to the R15/R16 protocol. This includes TCI-state configuration, activation, and indication.

TCI-state configuration: The network device configures a plurality of TCI-states for the terminal device via radio resource control (RRC) signaling. Each of these TCI-states includes a piece of QCL-Info of typeD. Alternatively, the network device may configure a TCI-state that does not include QCL-Info of typeD. However, the TCI-states do not indicate data transmit beams. Therefore, details are not further described herein.

TCI-state activation: After configuring the plurality of TCI-states, the network device further needs to activate eight TCI-states or eight TCI-state groups by using a medium access control-control element (MAC-CE).

In an implementation, each TCI field value corresponds to one TCI-state index, and the TCI-state index may uniquely identify one TCI-state. The eight TCI states are in a one-to-one correspondence with eight values of the TCI field in the DCI. That is, the eight TCI-states corresponding to the eight values of the TCI field in the DCI are determined by using the MAC CE signaling.

In an example, a MAC CE structure used to activate a TCI-state is shown in FIG. 1$a$. Fields T0 to T(N–2)×8+7 respectively correspond to TCI-states whose indexes are 0 to (N–2)×8+7 and that are configured in a first step, a size of each field is 1 bit, and a value may be 0 or 1. The value 1 indicates that the TCI-state is activated, and the value 0 indicates that the TCI-state is not activated. Theoretically, each MAC CE may have eight activation fields whose values are 1, and the others are all 0. TCI-states corresponding to the eight fields whose values are 1 are the eight TCI-states corresponding to the eight values of the TCI field in the DCI. For example, a smallest value 000 of the TCI field corresponds to an activated TCI-state with a smallest index in the MAC CE. The rest may be deduced by analogy.

In another example, a structure of a MAC CE used to activate a TCI-state is shown in FIG. 1$b$. Meanings of the fields T0 to T(N–2)×8+7 are the same as those in FIG. 1$a$, and a difference lies in the following: A first bit of the MAC CE shown in FIG. 1$b$ indicates a control resource set group index (CORESETpoolIndex), and indicates a control resource set (control-resource set, CORESET) group corresponding to a TCI-state activated by the MAC CE. CORESETpoolIndex may also be referred to as a CORESET group index or a CORESET pool index.

In another implementation, each TCI field value corresponds to a TCI-state group index, the TCI-state group index may uniquely identify one TCI-state group, and one TCI-state group includes one or two TCI-states. The eight TCI-state groups are in a one-to-one correspondence with eight values of the TCI field in the DCI. That is, the eight TCI-state groups corresponding to the eight values of the TCI field in the DCI are determined by using the MAC CE signaling.

In an example, a MAC CE structure used to activate a TCI-state group is shown in FIG. 1$c$. A TCI State ID$_{n,1}$ and a TCI State ID$_{n,2}$ represent two TCI-states in one TCI-state group, and each corresponds to one transmission reception point (transmission reception point, TRP). The subscript n indicates a TCI-state group index, and also indicates a TCI field value. In other words, when the TCI field value is n, it indicates that this TCI field indicates a TCI-state group n, where n=0,1, . . . , N The subscript 1 indicates a first TCI-state in the TCI-state group n, and the subscript 2 indicates a second TCI-state in the TCI-state group n. When $C_n$ =0, the MAC CE does not include the TCI State $ID_{n,2}$ field, and the TCI-state group n includes only one TCI-state. When $C_n$=1, the MAC CE includes the TCI State $ID_{n,2}$ field, and the TCI-state group n includes two TCI-states.

It should be noted that there are many types of MAC-CEs. In addition to the MAC-CE used for activating the TCI-state, there are many MAC-CEs having other functions. Details are not described herein.

TCI-state indication: The network device indicates a specific TCI-state by using the TCI field in the DCI. For example, when the value of the TCI field in the DCI sent by the network device to the terminal device is 000, it indicates a TCI-state or a TCI-state group that corresponds to 000 and that is used by the data transmit beam. QCL-Info whose type is typeD in the TCI-state or the TCI-state group includes a reference signal, and the reference signal is a channel state information reference signal (channel state information reference signal, CSI-RS) whose index is #1. It indicates that a receive beam corresponding to a beam used for data transmission is the same as a receive beam corresponding to a CSI-RS whose index is #1. The receive beam corresponding to the CSI-RS whose index is #1 may be determined through a beam measurement process, and is known to the terminal device. Therefore, the terminal device may determine, based on a specific TCI field value, the receive beam corresponding to the data transmit beam, to receive data over the corresponding receive beam.

4. CORESET

In a long term evolution (LTE) system, a physical downlink control channel (PDCCH) occupies an entire frequency band in frequency domain, and occupies first one to three orthogonal frequency division multiplexing (OFDM) symbols of each sub-frame in time domain (where a start position is always an OFDM symbol #0.) In other words, the network device notifies the quantity of OFDM symbols occupied by the PDCCH, so that the terminal device can determine search space of the PDCCH.

However, in an NR system, because a bandwidth of the system is large (where a maximum bandwidth may be 400 MHZ), if the PDCCH still occupies the entire bandwidth, not only resources are wasted, but also blind detection is complex. In addition, to increase system flexibility, a start position of the PDCCH in time domain may also be configured. In other words, in the NR system, the terminal device needs to learn of a position of the PDCCH in frequency domain and a position of the PDCCH in time domain, so as to successfully decode the PDCCH.

For convenience, the NR system encapsulates information such as a frequency band occupied by the PDCCH in frequency domain and a quantity of OFDM symbols occupied by the PDCCH in time domain into a CORESET, and encapsulates information such as a start OFDM symbol number of the PDCCH and a PDCCH monitoring period into search space (Search Space).

Main configuration parameters and functions of the main configuration parameters of the CORESET are as follows:

controlResourceSetId indicates a CORESET ID, which is used to identify a corresponding CORESET configuration.

frequencyDomainResources indicates a frequency domain resource of the CORESET.

duration indicates a quantity of symbols occupied by the CORESET in time domain.

cce-REG-MappingType indicates a mapping manner of mapping a control channel element (control channel element, CCE) to a resource element group (resource element group, REG).

precoderGranularity indicates a granularity of precoding in frequency domain.

tci-StatesPDCCH-ToAddList and tci-StatesPDCCH-ToReleaseList are used to configure a TCI-state corresponding to a CORESET.

tci-PresentInDCI indicates whether DCI includes a field indicating a PDSCH transmit beam.

5. BFR Process Defined in R15

5G uses analog beam-based high frequency communication, that is, the network device sends data over an analog beam, and the terminal device receives data over an analog beam. A signal coverage area of the analog beam is narrow, and is easily blocked by an obstacle. As a result, quality of a transmit beam deteriorates severely. In the R15 protocol, this phenomenon is defined as a beam failure (Beam Failure, BF), and a process is formulated to resolve the beam failure problem. The process is referred to as a beam failure recovery (Beam Failure Recovery, BFR) process. The BFR process may be divided into three steps: BFR configuration, beam failure detection, and beam failure recovery.

(1) BFR Configuration

To detect a beam failure, the network device configures a beam failure detection resource (RadioLinkMonitoringRS) group for the terminal device via radio resource control (radio resource control, RRC) signaling, to detect quality of a currently used transmit beam. Each beam failure detection resource is sent over one transmit beam. In other words, each beam failure detection resource corresponds to a transmit beam, and quality of a transmit beam corresponding to a beam failure detection resource may be obtained by measuring quality of the beam failure detection resource.

For example, a configuration related to beam failure detection is included in a RadioLinkMonitoringConfig information element, and a structure of the information element is as follows:

```
RadioLinkMonitoringConfig::=SEQUENCE {
failureDetectionResourcesToAddModList   SEQUENCE
    (SIZE(1 . . . maxNrofFailureDetectionResources)) OF
    RadioLinkMonitoringRS
failureDetectionResourcesToReleaseList   SEQUENCE
    (SIZE(1 . . . maxNrofFailureDetectionResources)) OF
    RadioLinkMonitoringRS-Id
beamFailureInstanceMaxCount ENUMERATED {n1, n2,
    n3, n4, n5, n6, n8, n10}
beamFailureDetectionTimer   ENUMERATED   {pbfd1,
    pbfd2, pbfd3, pbfd4, pbfd5, pbfd6, pbfd8, pbfd10}
}
```

Herein, failureDetectionResourcesToAddModList is used to configure a set of beam failure detection resources, beamFailureInstanceMaxCount is used to configure a counter related to beam failure detection, and beamFailureDetectionTimer is used to configure a timer related to beam failure detection.

A resource configuration is as follows:

```
RadioLinkMonitoringRS ::=          SEQUENCE {
radioLinkMonitoringRS-Id           RadioLinkMonitoringRS-Id,
purpose              ENUMERATED {beamFailure, rlf, both},
detectionResource                  CHOICE {
  ssb-Index                SSB-Index,
```

-continued

| csi-RS-Index | NZP-CSI-RS-ResourceId |
|---|---|
| }, | |
| ... | |
| } | |

Herein, adioLinkMonitoringRS-Id indicates a resource index, and is used to identify the resource; purpose indicates a use of the resource, and when purpose is configured as beamFailure, it indicates that the resource is a beam failure detection resource; and detectionResource indicates whether a type of the resource is an SSB resource or a CSI-RS resource.

In addition to the beam failure detection resource, the network device further configures a set of candidate beam resources for the terminal device. Each candidate beam resource is sent over one candidate beam. In other words, each candidate beam resource corresponds to one candidate beam, and quality of the candidate beam corresponding to the candidate beam resource can be obtained by measuring quality of the candidate beam resource. Therefore, when a beam failure occurs, a candidate beam with good quality is selected for transmission.

For example, the candidate beam resource is configured by using a beam failure recovery configuration (BeamFailureRecoveryConfig) information element, and a format of the beam failure recovery configuration information element is as follows:

```
BeamFailureRecoveryConfig ::=          SEQUENCE {
rsrp-ThresholdSSB          RSRP-Range
candidateBeamRSList            SEQUENCE (SIZE(1..maxNrofCandidateBeams))
OF PRACH-ResourceDedicatedBFR
recovery SearchSpaceId          Search SpaceId
beamFailureRecoveryTimer          ENUMERATED {ms10, ms20, ms40, ms60,
ms80, ms100, ms150, ms200}
}
```

Herein, rsrp-ThresholdSSB is for configuring a candidate beam decision threshold, candidateBeamRSList is for configuring a set of candidate beam resources, recoverySearchSpaceId is for configuring DCI search space for listening to a BFR response message, and beamFailureRecoveryTimer is for configuring a BFR timer. If BFR is not successful within a time period specified by the timer, the recovery is not continued.

(2) Beam Failure Detection

The terminal device measures quality of each beam failure detection resource in the set of beam failure detection resources, and determines whether quality of each beam failure detection resource is less than a threshold 1. If the quality of each beam failure detection resource is less than the threshold 1, it is considered that a beam failure occurs.

(3) Beam Failure Recovery

The terminal device notifies the network device of a beam (a new beam for short) corresponding to a candidate beam resource whose quality is greater than a threshold 2 in the set of candidate beam resources, so that the network device performs transmission over the new beam.

Figure 2:
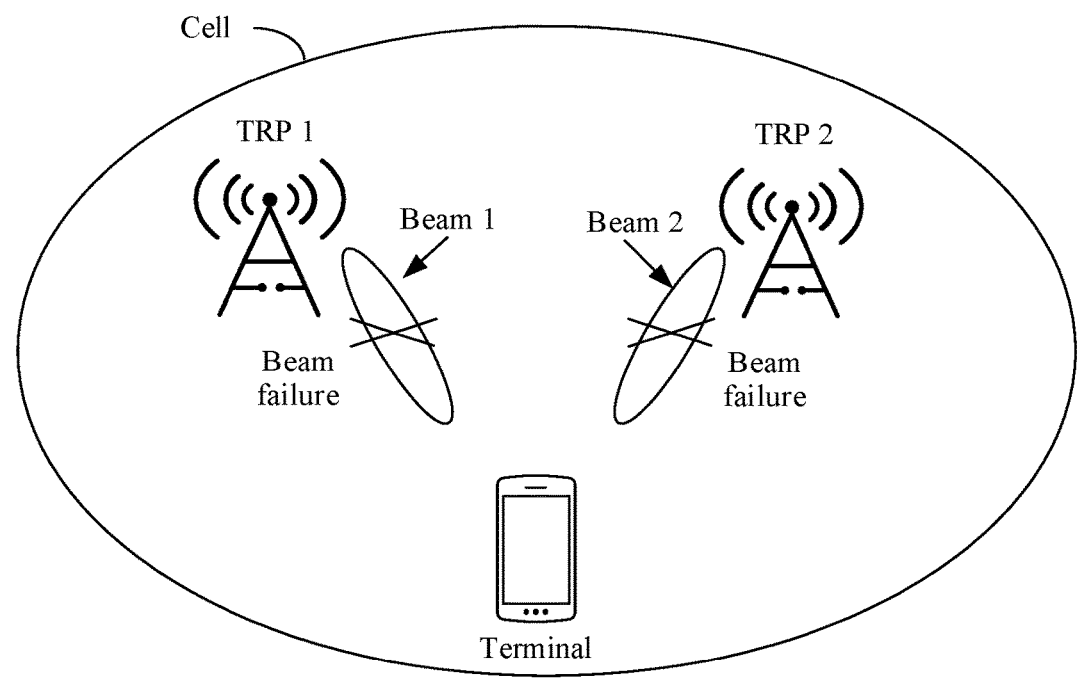
FIG. 2 is a schematic diagram of a cell-level beam failure according to this application.

The foregoing BFR process is mainly for a single-TRP transmission scenario, that is, a scenario in which the network device sends data to the terminal device in one cell by using one TRP. However, in practice, there may be a scenario in which the network device uses a plurality of TRPs to jointly send data to the terminal device in one cell. For example, as shown in FIG. 2, the cell sends data by using two TRPs. In this scenario, if the foregoing BFR process is still used, a set of beam failure detection resources configured by the network device corresponds to a TRP 1 and a TRP 2, and beam failure detection resources that are in the set of beam failure detection resources and that respectively correspond to the TRP 1 and the TRP 2 cannot be distinguished. When quality of all beam failure detection resources in the set of beam failure detection resources is less than the threshold 1, it means that a beam failure occurs in both the two TRPs. A beam failure of a single TRP cannot be detected in time. Therefore, beam failure recovery cannot be performed in time on a single TRP on which a beam failure occurs.

Figures 3, 4A:
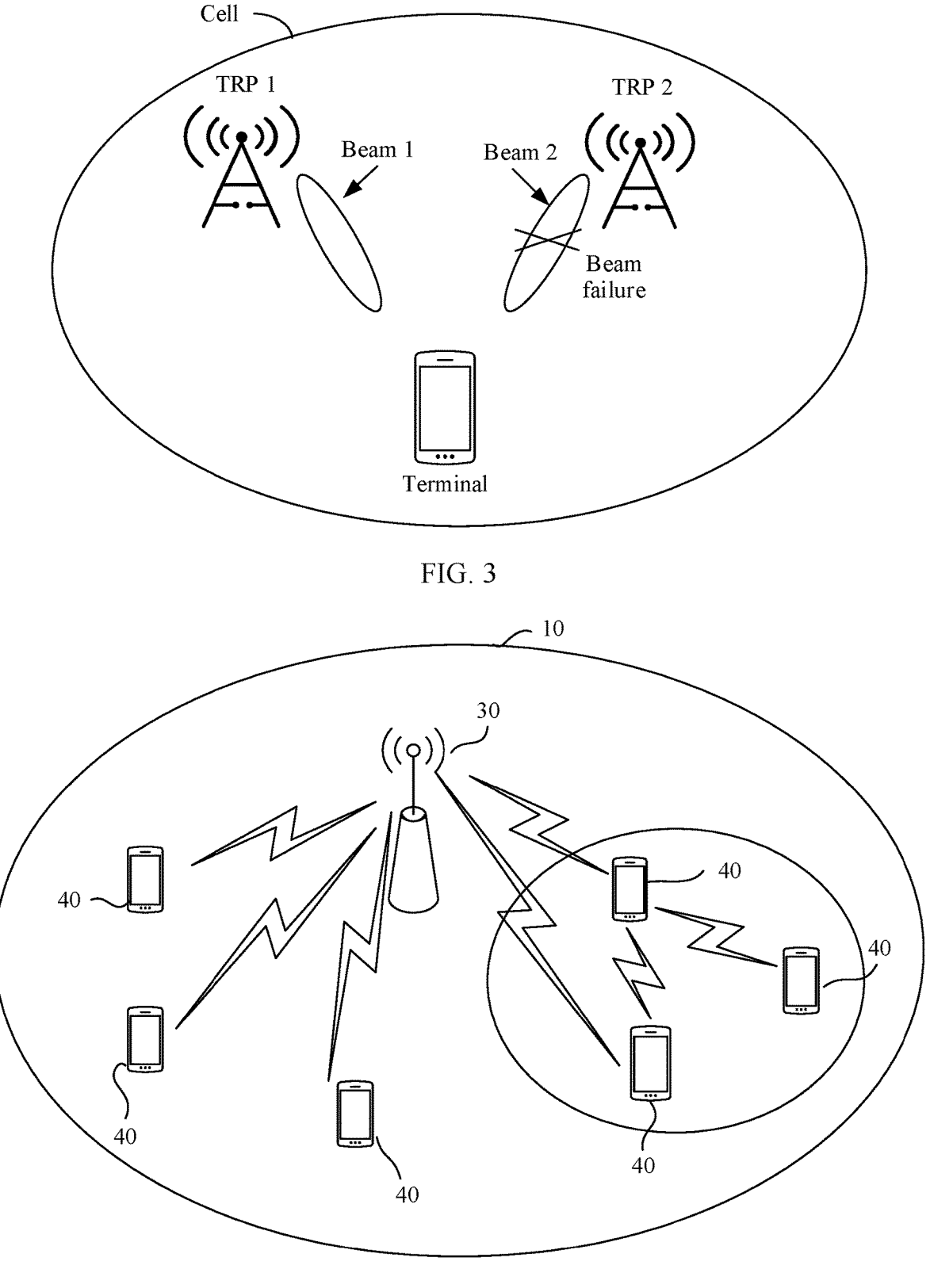
FIG. 3 is a schematic diagram of a TRP-level beam failure according to this application.
FIG. 4a is a schematic diagram of a structure of a communication system according to this application.

For example, as shown in FIG. 3, in a scenario in which a beam failure does not occur in the TRP 1 but a beam failure occurs in the TRP 2, the beam failure of the TRP 2 cannot be detected in time, and therefore beam failure recovery cannot be performed on the TRP 2 in time. Therefore, in this scenario, how to perform beam failure recovery is an urgent problem to be resolved currently.

Based on this, this application provides a beam failure recovery method, to perform partial beam failure recovery in time, and to simultaneously support TRP-level beam failure recovery and cell-level beam failure recovery.

The following describes the technical solutions in embodiments of this application with reference to the accompanying drawings in embodiments of this application. In the descriptions of this application, unless otherwise specified, "/" indicates an "or" relationship between associated objects. For example, A/B may indicate A or B. In this application, "and/or" describes only an association relationship between associated objects and indicates that three relationships may exist. For example, A and/or B may indicate the following three cases: Only A exists, both A and B exist, and only B exists, where A and B may be singular or plural. In addition, in the descriptions of this application, unless otherwise specified, "at least one" means one or more, and "a plurality of" means two or more. At least one of the following items (pieces) or a similar expression thereof refers to any combination of these items, including any combination of singular items (pieces) or plural items (pieces). For example, at least one item (piece) of a, b, or c may indicate a, b, c, a-b, a-c, b-c, or a-b-c, where "-" indicates that associated objects are in an "and" relationship, and a, b, and c may be singular or plural.

In addition, to clearly describe the technical solutions in embodiments of this application, terms such as first and second are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

The technical solutions in embodiments of this application may be applied to various communication systems, such as orthogonal frequency division multiple access (OFDMA), single carrier frequency division multiple access (SC-FDMA), a satellite communication system, a non-terrestrial network (NTN), an internet of things (IoT) system, a future-evolved communication system, or the like. Terms "system" and "network" may be interchanged with each other. The foregoing communication systems used in this application are merely examples for description, and are not limited thereto. Unified descriptions are provided herein and details are not described below again.

FIG. 4a shows a communication system 10 according to an embodiment of this application. The communication system 10 includes at least one network device 30 and one or more terminal devices 40 connected to the network device 30. Optionally, different terminal devices 40 may communicate with each other.

Figure 4B:
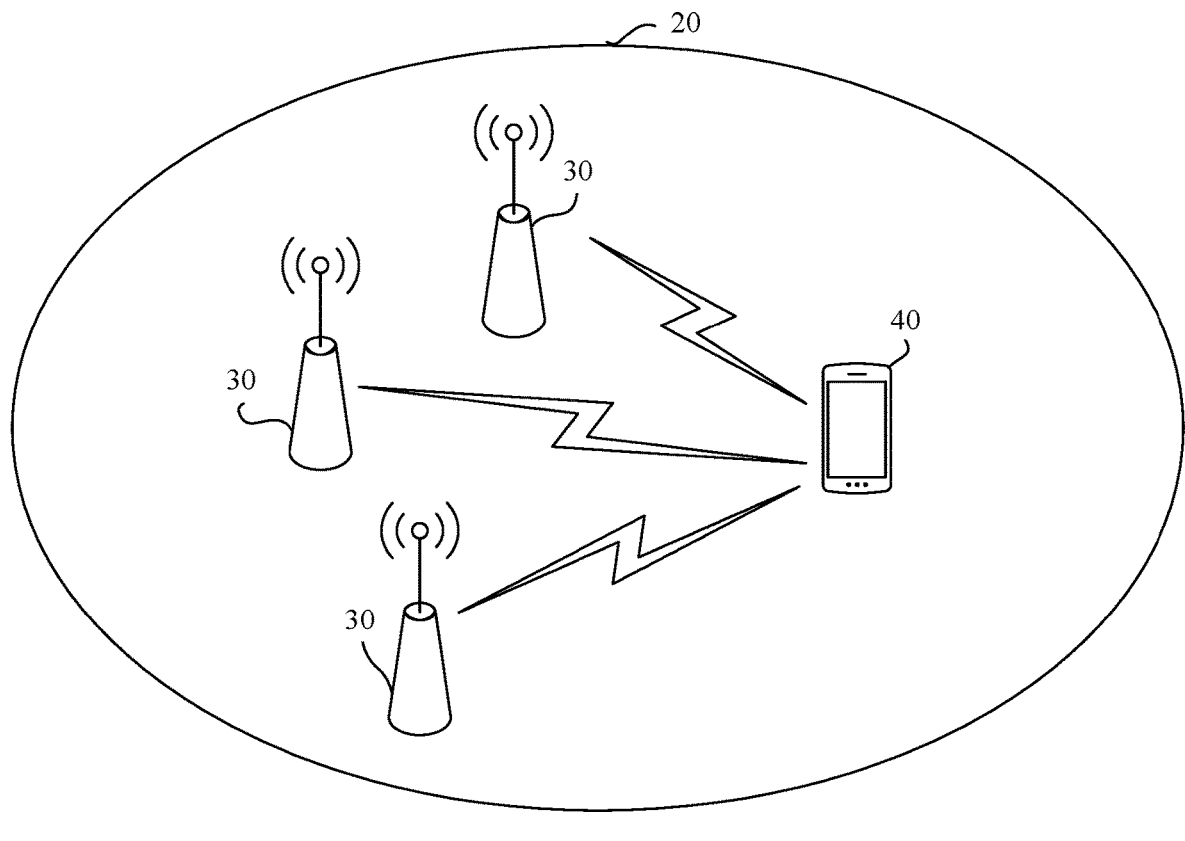
FIG. 4b is a schematic diagram of a structure of another communication system according to this application.

Alternatively, FIG. 4b shows another communication system 20 according to an embodiment of this application. The communication system 20 includes at least one terminal device 40 and one or more network devices 30 connected to the terminal device 40. Optionally, different network devices 30 may communicate with each other.

In some embodiments, the network device 30 in this embodiment of this application is a device for connecting the terminal device 40 to a wireless network. The network device 30 may be a node that includes a plurality of transmission reception points (transmission reception point, TRP) in a radio access network, may also be referred to as a base station, or may also be referred to as a radio access network (RAN) node (or device). For example, the network device may include an evolved NodeB (NodeB or eNB or e-NodeB) in a long term evolution (LTE) system or an LTE-advanced (LTE-A) system, such as a conventional macro base station eNB and a micro base station eNB in a heterogeneous network scenario; or may include a next generation NodeB (gNB) in a 5G NR system; or may further include a home base station (for example, home evolved NodeB, or home NodeB (HNB)), a baseband unit (BBU), a baseband pool BBU pool, a Wi-Fi access point (AP), or the like; or may further include a central unit (CU) and a distributed unit (DU) in a cloud radio access network (CloudRAN) system; or may further include a base station in a non-terrestrial network (NTN), that is, the base station may be deployed on a high-altitude platform or a satellite. In the NTN, the network device may serve as a layer 1 (L1) relay (relay), a base station, a DU, or an integrated access and backhaul (IAB) node. Alternatively, the network device may be a device that implements a base station function in an IoT, for example, a device that implements a base station function in an internet of vehicles (V2X), a device to device (D2D), or a machine to machine (M2M). This is not limited in embodiments of this application.

In some embodiments, the base station in this embodiment of this application may include various forms of base stations, for example, a macro base station, a micro base station (also referred to as a small cell), a relay station, an access point, a next-generation NodeB (gNB), a home base station (for example, a home evolved NodeB or a home NodeB (HNB)), a baseband unit (BBU), a transmitting and receiving point (TRP), a transmitting point (TP), and a mobile switching center. This is not specifically limited in this embodiment of this application.

In some embodiments, the terminal device 40 in this embodiment of this application may be a device configured to implement a wireless communication function, for example, a terminal or a chip that can be used in a terminal. The terminal may be user equipment (user equipment, UE), an access terminal, a terminal unit, a terminal station, a mobile station, a remote station, a remote terminal, a mobile device, a wireless communication device, a terminal agent, a terminal apparatus, or the like in a 5G network or a future evolved public land mobile network (PLMN). The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. Alternatively, the terminal may be a terminal having a communication function in the IoT, for example, a terminal in V2X (for example, an internet of vehicles device), a terminal in D2D communication, or a terminal in M2M communication. The terminal may be mobile or fixed. Optionally, the network device 30 and the terminal device 40 in this embodiment of this application may also be referred to as a communication apparatus. The network device 30 and the terminal device 40 may be a general-purpose device or a dedicated device. This is not specifically limited in this embodiment of this application.

Figure 5:
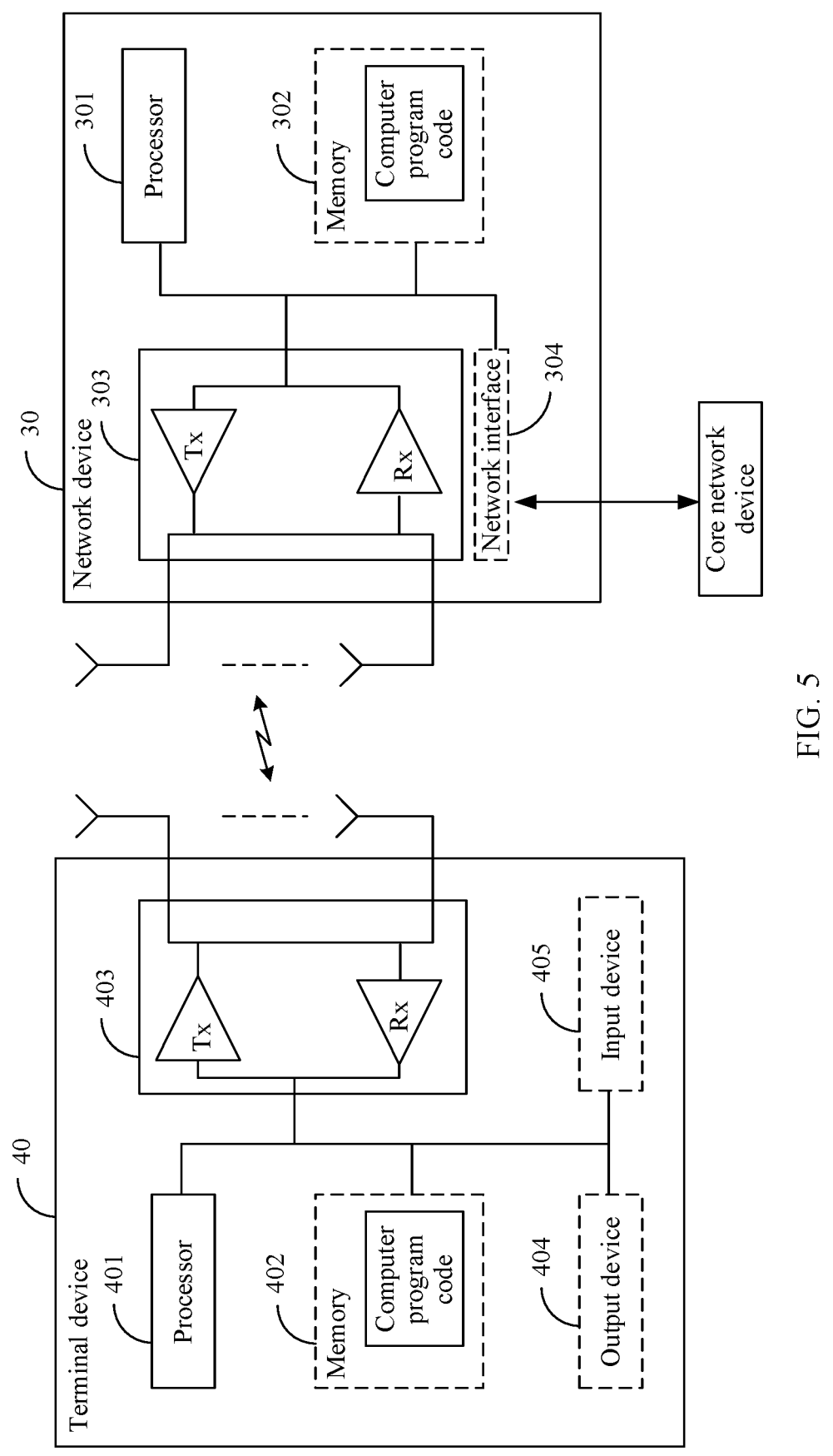
FIG. 5 is a schematic diagram of a structure of a terminal device and a network device according to this application.

In some embodiments, FIG. 5 is a schematic diagram of a structure of a network device 30 and a terminal device 40 according to an embodiment of this application.

The terminal device 40 includes at least one processor (an example in which one processor 401 is included is used for description in FIG. 5) and at least one transceiver (an example in which one transceiver 403 is included is used for description in FIG. 5). Optionally, the terminal device 40 may further include at least one memory (an example in which one memory 402 is included is used for description in FIG. 5), at least one output device (an example in which one output device 404 is included is used for description in FIG. 5), and at least one input device (an example in which one input device 405 is included is used for description in FIG. 5).

The processor 401, the memory 402, and the transceiver 403 are connected to each other through a communication line. The communication line may include a path for transmitting information between the foregoing components.

The processor 401 may be a general-purpose central processing unit (CPU), a microprocessor, an application-specific integrated circuit (ASIC), or one or more integrated circuits configured to control program execution of the solutions in this application. During specific implementation, in an embodiment, the processor 401 may alternatively include a plurality of CPUs, and the processor 401 may be a single-core (single-CPU) processor or a multi-core (multi-CPU) processor. The processor herein may be one or more devices, circuits, or processing cores configured to process data (for example, computer program instructions).

The memory 402 may be an apparatus having a storage function. For example, the memory 402 may be a read-only memory (ROM) or another type of static storage device capable of storing static information and instructions, may be a random access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile disc, a Blu-ray disc, or the like), a magnetic disk storage medium or another magnetic storage device, or any other medium capable of carrying or storing expected program code in a form of an instruction or a data structure and capable of being accessed by a computer. This is not limited thereto. The memory 402 may exist independently, and is connected to the processor 401 through the communication line. The memory 402 may alternatively be integrated with the processor 401.

The memory 402 is configured to store computer-executable instructions for performing the solutions in this application, and the processor 401 controls execution of the computer-executable instructions. Specifically, the processor 401 is configured to execute the computer-executable instructions stored in the memory 402, to implement the method in embodiments of this application.

In some embodiments, the computer-executable instructions in this embodiment of this application may also be referred to as application program code or computer program code. This is not specifically limited in this embodiment of this application.

The transceiver 403 may use any apparatus such as a transceiver, and is configured to communicate with another device or a communication network such as the Ethernet, a radio access network (RAN), or a wireless local area network (WLAN). The transceiver 403 includes a transmitter (Tx) and a receiver (Rx).

The output device 404 communicates with the processor 401, and may display information in a plurality of manners. For example, the output device 404 may be a liquid crystal display (LCD), a light emitting diode (LED) display device, a cathode ray tube (CRT) display device, a projector (projector), or the like.

The input device 405 communicates with the processor 401, and may receive user input in a plurality of manners. For example, the input device 405 may be a mouse, a keyboard, a touchscreen device, or a sensor device.

The network device 30 includes at least one processor (an example in which one processor 301 is included is used for description in FIG. 5) and at least one transceiver (an example in which one transceiver 303 is included is used for description in FIG. 5). Optionally, the network device 30 may further include at least one memory (an example in which one memory 302 is included is used for description in FIG. 5) and at least one network interface (an example in which one network interface 304 is included is used for description in FIG. 5). The processor 301, the memory 302, the transceiver 303, and the network interface 304 are connected through a communication line. The network interface 304 is configured to connect to a core network device over a link (for example, an SI interface), or connect to a network interface (not shown in FIG. 5) of another network device over a wired or wireless link (for example, an X2 interface). This is not specifically limited in this embodiment of this application. In addition, for related descriptions of the processor 301, the memory 302, and the transceiver 303, refer to descriptions of the processor 401, the memory 402, and the transceiver 403 in the terminal device 40. Details are not described herein again.

It may be understood that the structure shown in FIG. 5 does not constitute a specific limitation on the terminal device 40 and the network device 30. For example, in some other embodiments of this application, the terminal device 40 and the network device 30 may include more or fewer components than those shown in the figure, or combine some components, or split some components, or have different component arrangements. The components shown in the figure may be implemented by hardware, software, or a combination of software and hardware.

The beam failure recovery method provided in embodiments of this application is described below in detail by using an example in which the network device 30 and the terminal device 40 shown in FIG. 4a or FIG. 4b interact with each other.

It should be noted that, in the following embodiments of this application, names of messages or names of parameters in messages between devices are merely examples, and the messages or the parameters may have other names in specific implementations. This is not specifically limited in embodiments of this application.

As shown in FIG. 6, an embodiment of this application first provides a partial beam failure recovery method. The beam failure recovery method includes the following steps.

S601: A network device sends first configuration information to a terminal device. Correspondingly, the terminal device receives the first configuration information from the network device.

The first configuration information is used to configure N sets of beam failure detection resources and N sets of candidate beam resources, and N is a positive integer greater than 1. It may be understood that, before step S601, the network device may generate the first configuration information.

One set of beam failure detection resources includes one or more beam failure detection resources, and the beam failure detection resource is used for beam failure detection. One set of candidate beam resources includes one or more candidate beam resources, and the candidate beam resource is used to identify a new available beam.

In some embodiments, one set of beam failure detection resources in the N sets of beam failure detection resources is associated with one set of candidate beam resources in the N sets of candidate beam resources, and different sets of beam failure detection resources are associated with different sets of candidate beam resources.

In some embodiments, the N sets of beam failure detection resources are grouped based on TRPs in a cell, that is, each set of beam failure detection resources corresponds to one TRP in the cell. In this case, the first configuration information is used for TRP-level beam failure recovery.

In other words, the first configuration information is used for partial (Partial) beam failure recovery, and correspondingly, may also be referred to as "TRP-level beam failure recovery configuration information" or "partial (Partial) beam failure recovery configuration information". It should be noted that the "partial" in this application is a "part" relative to an entire cell. Certainly, the N sets of beam failure detection resources may alternatively be grouped based on another criterion, for example, be grouped based on a criterion finer than the TRP. In other words, a plurality of sets of beam failure detection resources correspond to one TRP. This is not specifically limited in this embodiment of this application.

It should be noted that, in this application, the N sets of beam failure detection resources are grouped based on TRPs in a cell for description. It may be understood that the method provided in this application may alternatively be appropriately modified to be applicable to another grouping criterion for the N sets of beam failure detection resources, for example, may be properly appropriately to be applicable to a scenario in which a plurality of sets of beam failure detection resources correspond to one TRP.

S602: The terminal device performs TRP-level beam failure recovery based on the first configuration information.

It should be noted that "TRP-level beam failure recovery" in this application may also be referred to as "partial beam failure recovery", which are interchangeable. This is not specifically limited in this application.

Based on this solution, the network device configures the N sets of beam failure detection resources and the N sets of candidate beam resources for one cell, and the terminal device may perform TRP-level beam failure recovery or perform partial beam failure recovery based on the N sets of beam failure detection resources and the N sets of candidate beam resources. In this way, the terminal device can detect a partial beam failure and perform partial beam failure recovery in time. Grouping the N sets of beam failure detection resources per-TRP configured can implement TRP-level beam failure recovery, so as to improve performance of multi-TRP transmission.

The following separately describes a manner of configuring the N sets of beam failure detection resources, a manner of configuring the N sets of candidate beam resources, and a manner of associating the set of beam failure detection resources with the set of candidate beam resources by using an example in which the sets of beam failure detection resources are per-TRP configured.

For manners of configuring the N sets of beam failure detection resources, manners of configuring the sets of beam failure detection resources for the terminal device by the network device may also be different in different embodiments of this application.

In some embodiments, the network device may explicitly configure the set of beam failure detection resources for the terminal device. Specifically, the first configuration information includes the N sets of beam failure detection resources, and each of the N sets of beam failure detection resources includes one or more beam failure detection resources.

In an example, a quantity of beam failure detection resources included in each set of beam failure detection resources does not exceed M, or a total quantity of beam failure detection resources included in the N sets of beam failure detection resources does not exceed P, where M is a positive integer greater than or equal to 1, and P is a positive integer greater than M.

For example, when N is equal to 2, a value of M may be 1 or 2, that is, a quantity of beam failure detection resources included in each set of beam failure detection resources is 1 or 2. Correspondingly, a value of P may be one of 2, 3, or 4. For example, if a set 1 of beam failure detection resources includes one beam failure detection resource, and a set 2 of beam failure detection resources includes two beam failure detection resources, a total quantity of beam failure detection resources included in the two sets of beam failure detection resources is 3. Alternatively, if both the set 1 of beam failure detection resources and the set 2 of beam failure detection resources include two beam failure detection resources, a total quantity of beam failure detection resources included in the two sets of beam failure detection resources is 4.

In view of the limitation on the quantity of beam failure detection resources, the network device does not configure a large quantity of beam failure detection resources for the terminal device. This reduces resource overheads.

In an example, the value of M or P may be configured by the network device, or may be reported by the terminal device to the network device.

In an example, a value of M may be limited to 1, that is, a quantity of beam failure detection resources included in each set of beam failure detection resources may be limited to 1, that is, each set of beam failure detection resources includes only one beam failure detection resource. In this case, configuring the N sets of beam failure detection resources may be replaced with configuring N beam failure detection resources, and each beam failure detection resource corresponds to one TRP. In this application, an example in which N sets of beam failure detection resources are configured is used for description.

It should be understood that the method in this application may be appropriately modified to be applicable to a case in which N beam failure detection resources are configured. For example, a set of beam failure detection resources in related description may be replaced with a beam failure detection resource. For example, an index of a set of beam failure detection resources is replaced with an index of a beam failure detection resource. In other words, that each TRP corresponds to a single beam failure detection resource may also be considered that each TRP corresponds to one set of beam failure detection resources, and the set of beam failure detection resources includes one beam failure detection resource.

In some other embodiments, the network device may implicitly configure the set of beam failure detection resources for the terminal device. Specifically, the first configuration information may include N CORESET groups or a plurality of CORESETs that form N CORESET groups.

One CORESET group includes one or more CORESETs corresponding to one TRP. Alternatively, one CORESET group includes CORESETs that have a same CORESETPool Index value, CORESETPoolIndex corresponds to a TRP, and one CORESETPoolIndex corresponds to one TRP. That is, one CORESET group corresponds to one TRP. That the CORESET group corresponds to the TRP may be understood as follows: A PDCCH corresponding to a CORESET in the CORESET group is sent by the TRP.

In an example, each of the N CORESET groups is for determining one set of beam failure detection resources. For example, QCL resources of all CORESETs included in one CORESET group are used as beam failure detection resources in one set of beam failure detection resources, or QCL resources of K CORESETs included in one CORESET group are used as beam failure detection resources in one set of beam failure detection resources. In other words, K CORESETs are selected from each of the N CORESET groups, and QCL resources of the K CORESETs are used as beam failure detection resources in one set of beam failure detection resources.

The set of beam failure detection resources determined based on the QCL resources of the CORESET group may be referred to as a set of beam failure detection resources corresponding to the CORESET group.

The QCL resources of the CORESET are reference signal resources included in one piece of QCL-Info in a currently active TCI-state of the CORESET, and a QCL type corresponding to the QCL resource may be typeA, typeB, typeC, or typeD. This is not specifically limited in this application.

In an example, QCL resources of K CORESETs included in a CORESET group are used as beam failure detection resources in a set of beam failure detection resources, and the K CORESETs may be K CORESETs with smallest indexes, K CORESETs with largest indexes, first K CORE- SETs, last K CORESETs, K CORESETs that are first configured, K CORESETs that are finally configured, or K CORESETs with minimum periods in the CORESET group.

For example, when the K CORESETs in the CORESET group are selected based on periods of the CORESETs, the CORESETs may be sorted in ascending order of periods. Further, when there are same periods of a plurality of CORESETs in the CORESET group, the plurality of CORE-SETs with the same period may be sorted based on index sizes or a configuration sequence, and then first K CORE-SETs that are sorted are selected.

For example, the N CORESET groups include a third CORESET group, and the third CORESET is for determining a third set of beam failure detection resources in the N sets of beam failure detection resources. A plurality of beam failure detection resources included in the third set of beam failure detection resources are QCL resources of all CORE-SETs in the third CORESET group. Alternatively, the third set of beam failure detection resources includes K beam failure detection resources, and the K beam failure detection resources are QCL resources of K CORESETs in the third CORESET group.

It should be noted that the method provided in this application further relates to a first set of beam failure detection resources, a second set of beam failure detection resources, a first CORESET group, and a second CORESET group. Details are not described herein in subsequent embodiments.

In an example, the K CORESETs may be K CORESETs with smallest indexes in the third CORESET group; or may be K CORESETs with largest indexes in the third CORE-SET group;

or may be first K CORESETs in the third CORESET group; or may be last K CORESETs in the third CORESET group; or may be K CORESETs that are first configured in the third CORESET group; or may be K CORESETs that are finally configured in the third CORESET group; or may be K CORESETs with minimum periods in the third CORE-SET group.

For example, when the K CORESETs in the CORESET group are selected based on periods of CORESETs, the K CORESETs may be first K CORESETs in the third CORE-SET. CORESETs in the third CORESET group may be sorted in ascending order of periods corresponding to the CORESETs. When periods corresponding to a plurality of CORESETs are the same, the plurality of CORESETs are sorted based on index sizes or a configuration sequence.

For example, the CORESETs forming the third CORE-SET group include a CORESET #1, a CORESET #2, a CORESET #3, and a CORESET #4, and respective periods of the four CORESETs are respectively 30, 20, 20, and 10. If the CORESETs are sorted in ascending order of the corresponding periods, and the periods corresponding to the CORESETs are the same, the CORESETs are sorted in ascending order of indexes, and the CORESETs in the third CORESET group are sorted in the order of the CORESET #4, the CORESET #2, the CORESET #3, and the CORESET #1. If K is equal to 2, the two CORESETs are the CORESET #4 and the CORESET #2.

Further, in an example, a total quantity of QCL resources that are of CORESETs in the N CORESET groups and that are used as beam failure detection resources does not exceed P1. For example, when N is equal to 2, a value of K may be 1 or 2, and a value of P1 may be one of 2, 3, or 4.

Based on the limitation on the quantity of QCL resources that are of the CORESETs and that are used as the beam failure detection resources, the network device can be prevented from configuring a large quantity of beam failure detection resources to the terminal device. This reduces resource overheads.

In an example, the value of K or P1 may be configured by the network device, or may be reported by the terminal device to the network device.

In still some embodiments, the network device may configure the N sets of beam failure detection resources for the terminal device in an explicit and implicit combination manner. Specifically, the first configuration information may include N1 CORESET groups and N2 sets of beam failure detection resources, each of the N1 CORESET groups is for determining one set of beam failure detection resources, and N1 and N2 are positive integers. N1+N2=N, that is, the network device implicitly configures N1 sets of beam failure detection resources, explicitly configures N2 sets of beam failure detection resources, and the set of explicitly config-ured beam failure detection resources is different from the set of implicitly configured beam failure detection resources.

In other words, the network device configures N1 (N1<N) CORESET groups for the terminal device, and each CORE-SET group corresponds to one TRP. A set of beam failure detection resources of a TRP may be determined by using each CORESET group. For example, QCL resources of all or some (for example, K) CORESETs in a CORESET group are used to form a set of beam failure detection resources used for beam failure detection of a corresponding TRP.

Reference may be made to the foregoing related descrip-tion, and details are not described herein again. In other words, the network device may implicitly configure the N1 sets of beam failure detection resources. For a TRP for which no corresponding CORESET group is configured, the network device may configure a set of beam failure detec-tion resources for the TRP in an explicit manner, that is, the network device may additionally configure N2=N−N1 sets of beam failure detection resources. For example, the first configuration information includes the N2 sets of beam failure detection resources. N1 and N2 are positive integers. For example, N1=N2=1.

In an example, an example in which N=2 and N1=N2=1 is used for description. The network device configures one or more CORESETs, and the one or more CORESETs are used as one CORESET group. For example, CORESET-PoolIndex corresponding to the one or more CORESETs are equal. QCL resources of all or some (for example, K) CORESETs in the CORESET group are used as a set of beam failure detection resources, used for performing beam failure detection on one TRP. In addition, the network device explicitly configures one set of beam failure detection resources for the terminal device, to perform beam failure detection on another TRP.

A configuration manner of the N sets of candidate beam resources is as follows.

In some embodiments, the first configuration information includes N sets of candidate beam resources, and each of the N sets of candidate beam resources includes one or more candidate beam resources.

In an example, a quantity of candidate beam resources included in each set of candidate beam resources does not exceed M2, or a total quantity of candidate beam resources included in the N sets of candidate beam resources does not exceed P2, where M2 is a positive integer greater than or equal to 1, and P2 is a positive integer greater than M.

In an example, the value of M2 or P2 may be configured by the network device, or may be reported by the terminal device to the network device.

In an example, the N sets of candidate beam resources may be included in the N beam failure recovery configurations in the first configuration information. Each beam failure recovery configuration corresponds to one TRP, and includes one set of candidate beam resources. Certainly, the beam failure recovery configuration may further include another related parameter used for beam failure recovery, for example, a BFR timer. In other words, the first configuration information includes the N beam failure recovery configurations, and each of the N beam failure recovery configurations includes one set of candidate beam resources.

A manner of associating the set of beam failure detection resources with the set of candidate beam resources is as follows.

When the sets of beam failure detection resources are configured in an explicit manner, that is, when the N sets of beam failure detection resources are explicitly configured, a first association manner may be used. The first association manner is that the N sets of candidate beam resources are one-to-one associated with the N sets of explicitly configured beam failure detection resources.

In an example, the set of candidate beam resources may include an index of a set of beam failure detection resources. Alternatively, the set of candidate beam resources may include an index of a beam failure detection resource. Alternatively, the set of beam failure detection resources includes an index of a set of candidate beam resources. Alternatively, the beam failure detection resource includes an index of the set of candidate beam resources. Alternatively, the set of candidate beam resources is associated with the set of beam failure detection resources in a configuration sequence. For example, a configured set of candidate beam resources is associated with a configured first set of beam failure detection resources, a configured second set of candidate beam resources is associated with a configured second set of beam failure detection resources, and so on. Alternatively, the set of candidate beam resources and the set of beam failure detection resources include a same first index, and the first index may be, for example, a TRP index, a CORESET group index (CORESETPoolIndex), or the like.

When the sets of beam failure detection resources are configured in an implicit manner, that is, when QCL resources of the N CORESET groups are separately used as the N sets of beam failure detection resources, a second association manner may be used. The second association manner is that the N sets of candidate beam resources are one-to-one associated with the N sets of implicitly configured beam failure detection resources, or are one-to-one associated with the N CORESET groups.

In an example, the set of candidate beam resources may include an index (CORESETpoolIndex) of the CORESET group, and this indicates that the set of candidate beam resources is associated with the CORESET group, or indicates that the set of candidate beam resources is associated with a set of beam failure detection resources corresponding to the CORESET group. Alternatively, the CORESET group is associated with the set of candidate beam resources in a sequence of group indexes. For example, N=2. A set of candidate beam resources with a smaller index is associated with a CORESET group whose group index is 0, and a set of candidate beam resources with a larger index is associated with a CORESET group whose group index is 1. Alternatively, the set of candidate beam resources with the smaller index is associated with the CORESET group whose group index is 1, and the set of candidate beam resources with the larger index is associated with the CORESET group whose group index is 0.

When the sets of beam failure detection resources are configured in the explicit and implicit combination manner, a third association manner may be used. The third association manner is that the N sets of candidate beam resources are one-to-one associated with N1 implicitly configured sets of beam failure detection resources and N2 sets of explicitly configured beam failure detection resources.

In an example, first N1 sets of candidate beam resource in the N sets of candidate beam resources are associated with the N1 sets of implicitly configured beam failure detection resources, and last N2 sets of candidate beam resources are associated with the N2 sets of explicitly configured beam failure detection resources. Alternatively, the first N2 sets of candidate beam resource in the N sets of candidate beam resources are associated with the N2 sets of explicitly configured beam failure detection resources, and the last N1 sets of candidate beam resources are associated with the N1 sets of implicitly configured beam failure detection resources.

For example, when the sets of candidate beam resources are associated with the set of implicitly configured beam failure detection resources, a set of candidate beam resources may include a CORESET group index, to indicate a CORESET group associated with the set of candidate beam resources, or indicate a set of beam failure detection resources corresponding to a CORESET group associated with the set of candidate beam resources. When the set of candidate beam resources is associated with the set of explicitly configured beam failure detection resources, the set of candidate beam resources may include an index of a set of beam failure detection resources, to indicate the set of beam failure detection resources associated with the set of candidate beam resources.

It can be learned from the foregoing description that the network device may configure the set of beam failure detection resources for the terminal device in an explicit manner, an implicit manner, or a combination of explicit and implicit manners. A manner in which the network device finally configures the sets of beam failure detection resources, or a manner in which the terminal device finally configures the sets of beam failure detection resources, may be determined by using the following two solutions.

Solution 1: Specify that the network device configures the set of beam failure detection resources in a specific configuration manner under a specific condition, or specify that the terminal device configures the set of beam failure detection resources in a specific manner under a specific condition.

In some embodiments, it may be specified as follows.

When a first condition is met, the network device configures the sets of beam failure detection resources in the explicit configuration manner, or the terminal device explicitly configures the sets of beam failure detection resources. Correspondingly, the first association manner is used for associating the sets of beam failure detection resources with the sets of candidate beam resources.

When a second condition is met, the network device configures the sets of beam failure detection resources in the implicit configuration manner, or the terminal device implicitly configures the sets of beam failure detection resources. Correspondingly, the second association manner is used for associating the sets of beam failure detection resources with the sets of candidate beam resources.

When a third condition is met, the network device configures the sets of beam failure detection resources in the explicit and implicit combination configuration manner, or the terminal device configures the set of beam failure detection resources in the explicit and implicit combination configuration manner. Correspondingly, the third association manner is used for associating the sets of beam failure detection resources with the sets of candidate beam resources.

In an example, the first condition includes one or a combination of more of the following:

(1) The network device configures a plurality of sets of beam failure detection resources for the terminal device.

(2) The network device configures, for the terminal device, a set of beam failure detection resources used for TRP-level beam failure detection.

(3) The network device configures, for the terminal device, a plurality of sets of beam failure detection resources used for TRP-level beam failure detection.

(4) The network device configures a plurality of sets of candidate beam resources for the terminal device.

(5) CORESETPoolIndex values corresponding to all CORESETs configured by the network device are the same. For example, the CORESETPoolIndex values corresponding to all the CORESETs are 0. Alternatively, the CORESETPoolIndex values corresponding to all CORESETs are 1. Alternatively, the CORESETPoolIndex values corresponding to all the CORESETs are not configured (a default value is 0 when the CORESETPoolIndex values not configured). Alternatively, CORESETPoolIndex values corresponding to some CORESETs are configured to 0, and CORESETPoolIndex values corresponding to other CORESETs are not configured (that is, the default value is 0).

(6) The network device configures a set of first parameters for the terminal device, where the set of first parameters includes a related parameter used for TRP-level beam failure detection, for example, a beam failure detection counter and a timer corresponding to each TRP, that is, a plurality of beam failure detection counters and timers are configured. For example, the set of first parameters may be configured in a RadioLinkMonitoringConfig-r17 information element, or a BeamFailureDetectionConfig-r17 information element, or a PartialBeamFailureDetectionConfig information element.

(7) The network device configures a set of second parameters for the terminal device, where the set of second parameters includes a related parameter used for TRP-level beam failure recovery, for example, a set of candidate beam resources corresponding to each TRP, that is, a plurality of sets of candidate beam resources are configured. The set of second parameters may be collectively referred to as a beam failure recovery configuration. For example, the set of second parameters may be configured in a BeamFailureRecoveryConfig-r17 information element or a PartialBeamFailureRecoveryConfig information element.

(8) A first switch parameter is configured to be enabled, where the first switch parameter indicates whether to enable TRP-level beam failure recovery. If the first switch parameter is configured to be enabled, it indicates that TRP-level beam failure recovery is enabled. If the first switch parameter is configured to be disabled, it indicates that TRP-level beam failure recovery is disabled.

For example, each of the plurality of conditions may be used only as a determining condition for the network device or the terminal device, or may be used as a determining condition for the network device and the terminal device. For example, the foregoing conditions (1) to (4) may be used only as determining conditions for the terminal device, that is, when one or more of the conditions (1) to (4) are met, the terminal device explicitly configures the sets of beam failure detection resources. The foregoing condition (5) may be used only as a determining condition for the network device, that is, when the condition (5) is met, the network device configures the sets of beam failure detection resources in the explicit configuration manner. The foregoing conditions (6) to (8) may be used as determining conditions for the network device and the terminal device, that is, when one or more of the conditions (6) to (8) are met, the network device configures the sets of beam failure detection resources in the explicit configuration manner, and the terminal device explicitly configures the sets of beam failure detection resources.

In an example, the second condition may include one or more of the following:

(1) The network device does not configure a plurality of sets of beam failure detection resources for the terminal device.

(2) The network device does not configure, for the terminal device, a set of beam failure detection resources for TRP-level beam failure detection.

(3) The network device does not configure the set of first parameters for the terminal device.

(4) All CORESETs configured by the network device correspond to a plurality of different CORESETPoolIndex values. For example, CORESETPoolIndex values corresponding to some CORESETs are 1, and CORESETPoolIndex values corresponding to other CORESETs are 0, or CORESETPoolIndex values corresponding to other CORESETs are not configured.

(5) The network device configures the set of second parameters for the terminal device.

(6) The network device configures a plurality of sets of candidate beam resources for the terminal device.

(7) The first switch parameter is configured to be enabled.

For example, each of the plurality of conditions may be used only as a determining condition for the network device or the terminal device, or may be used as a determining condition for the network device and the terminal device. For example, the foregoing conditions (1) to (3) may be used only as determining conditions for the network device, that is, when one or more of the conditions (1) to (3) are met, the network device configures the sets of beam failure detection resources in the implicit configuration manner. The foregoing condition (4) may be used only as a determining condition for the terminal device, that is, when the condition (4) is met, the terminal device implicitly configures the sets of beam failure detection resources. The foregoing conditions (5) to (7) may be used as determining conditions for the network device and the terminal device, that is, when one or more of the conditions (5) to (7) are met, the network device configures the sets of beam failure detection resources in the implicit configuration manner, and the terminal device implicitly configures the sets of beam failure detection resources.

In an example, the third condition includes one or a combination of more of the following:

(1) The network device configures, for the terminal device, a set of beam failure detection resources used for TRP-level beam failure detection.

(2) The network device configures a plurality of sets of candidate beam resources for the terminal device.

(3) All CORESETs configured by the network device correspond to a plurality of different CORESETPoolIndex values. For example, CORESETPoolIndex values corresponding to some CORESETs are 1, and CORESETPoolIndex values corresponding to other CORESETs are 0, or CORESETPoolIndex values corresponding to other CORESETs are not configured.

(4) The network device configures the set of first parameters for the terminal device.

(5) The network device configures the set of second parameters for the terminal device.

(6) The first switch parameter is configured to be enabled.

For example, each of the plurality of conditions may be used as a determining condition for the network device and the terminal device. For example, the foregoing conditions (1) to (6) may be used as determining conditions for the network device and the terminal device, that is, when one or more of the conditions (1) to (6) are met, the network device configures the sets of beam failure detection resources in the explicit and implicit combination configuration manner, and the terminal device configures the sets of beam failure detection resources in the explicit and implicit combination configuration manner.

In some embodiments, "a plurality" of the first condition, the second condition, and the third condition may be "two".

Manner 2: Specify that the network device configures, when the network device configures a plurality of CORESET group values, the sets of beam failure detection resources in the implicit manner, and does not configure the sets of beam failure detection resources in the explicit manner. Alternatively, when the network device configures a plurality of CORESET group values, the terminal device implicitly configures the sets of beam failure detection resources.

The following describes a process in which the terminal device performs TRP-level beam failure recovery based on the first configuration information.

In some embodiments, as shown in FIG. 7, that the terminal device performs TRP-level beam failure recovery based on the first configuration information may include the following steps.

S6021: The terminal device detects quality of beam failure detection resources in N sets of beam failure detection resources.

A first set of beam failure detection resources in the N sets of beam failure detection resources is used as an example. In some embodiments, when quality of all beam failure detection resources in the first set of beam failure detection resources is less than a first threshold, the terminal device determines that a beam failure occurs in the first set of beam failure detection resources, or a beam failure occurs on a TRP corresponding to the first set of beam failure detection resources, and the following step S6022 is performed. In the following, an example in which a beam failure occurs in a set of beam failure detection resources indicates that quality of all beam failure detection resources in the set of beam failure detection resources is less than the first threshold is used for description. In addition, that a beam failure occurs on beam failure detection resources means that quality of the beam failure detection resources is less than the first threshold.

In some other embodiments, when a quantity of beam failure detection resources whose quality is less than the first threshold in the first set of beam failure detection resources is greater than a first value, the terminal device determines that a beam failure occurs in the first set of beam failure detection resources, or a beam failure occurs in a TRP corresponding to the first set of beam failure detection resources, and the following step S6022 is performed.

In an example, the first threshold may be specified in a protocol, or may be configured by the network device, or may be independently determined by the terminal device. This is not specifically limited in this application.

S6022: A layer-1 entity of the terminal device sends beam failure indication information to an upper-layer entity of the terminal device.

The layer-1 entity may be a physical layer entity, and the upper-layer entity may be a protocol layer entity above the physical layer entity, for example, a media access control (media access control, MAC) layer entity.

In some embodiments, the beam failure indication information may include information about the set of beam failure detection resources in which the beam failure occurs, and/or a beam failure type, where quality of all beam failure detection resources in the set of beam failure detection resources in which the beam failure occurs is less than the first threshold, and the beam failure type includes a TRP-level beam failure or a cell-level beam failure.

In an example, the information about the set of beam failure detection resources on which the beam failure occurs may be an index of the set of beam failure detection resources, for example, an index of a first set of beam failure detection resources; or an index of a beam failure detection resource in the set of beam failure detection resources, for example, an index of a beam failure detection resource in the first set of beam failure detection resources; or a CORESET group index corresponding to the set of beam failure detection resources, for example, a CORESET group index corresponding to the first set of beam failure detection resources; or an index of a set of candidate beam resources associated with the set of beam failure detection resources, for example, an index of a set of candidate beam resources, where the set of candidate beam resources is a set of candidate beam resources associated with the first set of beam failure detection resources in N sets of candidate beam resources.

In an example, if a beam failure occurs only in the first set of beam failure detection resources, the beam failure type is the TRP-level beam failure.

It should be noted that "TRP-level beam failure" in this application may also be referred to as "partial beam failure", and the two may be mutually replaced. This is not specifically limited in this application.

Further, the beam failure indication information may further include information indicating a first candidate beam resource, where the first candidate beam resource is a candidate beam resource whose quality is greater than a second threshold in a first set of candidate beam resources. In this case, the following step S6023a may be performed. Certainly, when there is the first candidate beam resource, even if the beam failure indication information does not include the information indicating the first candidate beam resource, the following step S6023a may be performed. In other words, the step S6023a may be performed as long as the first candidate beam resource exists.

In an example, the first candidate beam resource may be determined by the terminal device from the set of candidate beam resources after determining that the beam failure occurs in the first set of beam failure detection resources, or may be determined by the terminal device from the set of candidate beam resources at another time. This is not specifically limited in this application.

It should be noted that step S6022 is an optional step, that is, the terminal device may not perform step S6022.

It may be understood that there may be no candidate beam resource whose quality is greater than the second threshold in the set of candidate beam resources. In this case, the following step S6023b may be performed.

S6023a. The terminal device sends first indication information to the network device. Correspondingly, the network device receives the first indication information from the terminal device.

The first indication information indicates a first beam corresponding to the first candidate beam resource. For example, the first indication information may be an index of the first beam or an index of the first candidate beam resource.

It should be noted that the "first indication information" in this application may also be referred to as "beam failure recovery request information", and the "first indication information" and the "beam failure recovery request information" may be mutually replaced. This is not specifically limited in this application.

In some embodiments, the terminal device may send the first indication information to the network device via a message 1 (message 1, Msg1) in a random access process, a message 3 (message 3, Msg3) in the random access process, a physical uplink control channel (physical uplink control channel, PUCCH), or a MAC CE.

In an example, when sending the first indication information to the network device via the MAC CE, the terminal device may first send a scheduling request (scheduling request, SR) to the network device over a first PUCCH. The SR is used to request the network device to schedule an uplink transmission resource. After receiving the SR, the network device may schedule the uplink transmission resource via DCI. Then, the terminal device sends the MAC CE to the network device on the uplink transmission resource scheduled by the network device, where the MAC CE includes (or carries) the first indication information.

In an example, the first PUCCH may be referred to as an SR resource. Sending the SR to the network device over the first PUCCH may be understood as sending the first PUCCH to the network device, where the first PUCCH carries the SR.

In an example, the first PUCCH may be configured by the network device for the terminal device. For example, the network device may configure the first PUCCH for the terminal device, and configure N transmit beams for the first PUCCH. The N transmit beams of the first PUCCH respectively point to the N TRPs. In other words, the N transmit beams are one-to-one associated with the N TRPs. The transmit beam of the first PUCCH may be a spatial relation, a TCI-state, or another configuration parameter representing an uplink transmit beam.

When a beam failure occurs on a TRP, and when the terminal device sends the SR to the network device over the first PUCCH, the terminal device may send the SR over a transmit beam pointing to another TRP in the N transmit beams of the first PUCCH, that is, send the first PUCCH over the transmit beam pointing to the another TRP in the N transmit beams one the first PUCCH, where the first PUCCH carries the SR. For example, N=2. When a beam failure occurs on one TRP, the terminal device sends a PUCCH over a transmit beam pointing to another TRP.

For example, transmit beams of the PUCCH are a transmit beam 1 and a transmit beam 2, and are associated with a TRP 1 and a TRP 2, respectively. When a beam failure occurs on the TRP 1, the terminal device sends the PUCCH over the transmit beam 2 of the PUCCH.

In other words, that the first set of beam failure detection resources corresponds to the first TRP is used as an example. When a beam failure occurs on the first TRP, the terminal device sends the SR to the network device over a first transmit beam in the N transmit beams of the first PUCCH, where the first transmit beam is a transmit beam associated with a second TRP, and the second TRP is a TRP other than the first TRP in the cell.

In different embodiments of this application, association relationships between the N transmit beams of the first PUCCH and the N TRPs may also be different.

In some embodiments, the association relationship between the N transmit beams of the first PUCCH and the N TRPs may be reflected as an association relationship between the N transmit beams of the first PUCCH and the N sets of beam failure detection resources.

In an example, any one of the following association relationships may be used.

(1) The N sets of beam failure detection resources are one-to-one associated with the N transmit beams of the first PUCCH according to a configuration sequence. For example, a first set of beam failure detection resources is associated with a first transmit beam of the first PUCCH, a second set of beam failure detection resources is associated with a second transmit beam of the first PUCCH, and so on.

It should be noted that an "$N^{th}$ set of beam failure detection resources" involved herein is an $n^{th}$ set of beam failure detection resources in the N sets of beam failure detection resources sorted according to the configuration sequence. An "$n^{th}$ transmit beam of the first PUCCH" is an $n^{th}$ transmit beam of the N transmit beams that are of the first PUCCH and that are sorted based on the configuration sequence, where n=1, 2, . . . , N.

(2) The N sets of beam failure detection resources are one-to-one associated with the N first PUCCH transmit beams based on index sizes. For example, a set of beam failure detection resources with a smallest index is associated with the first transmit beam of the first PUCCH, a set of beam failure detection resources with a second smallest index is associated with a second transmit beam of the first PUCCH, and so on.

It should be noted that the "$n^{th}$ transmit beam of the first PUCCH" herein is an $n^{th}$ transmit beam of the N transmit beams that are of the first PUCCH and that are sorted based on a configuration sequence or index sizes, where n=1, 2, . . . , N.

In other words, the first transmit beam of the first PUCCH is associated with the second set of beam failure detection resources, and the second set of beam failure detection resources is a set of beam failure detection resources that corresponds to the second TRP in the N beam failure detection resources. The second set of beam failure detection resources is different from the first set of beam failure detection resources.

In some other embodiments, the association relationship between the N transmit beams of the first PUCCH and the N TRPs may be reflected as an association relationship between the N transmit beams of the first PUCCH and the N sets of candidate beam resources. For specific details, refer to the association relationship between the N transmit beams of the first PUCCH and the N sets of beam failure detection resources, but the sets of beam failure detection resources in the N sets of beam failure detection resources are replaced with the sets of candidate beam resources.

In other words, the first transmit beam of the first PUCCH is associated with a second set of candidate beam resources, the second set of candidate beam resources is a set of candidate beam resources that is associated with the second set of beam failure detection resources in the N sets of candidate beam resources, and the second set of beam failure detection resources corresponds to the second TRP.

In still some embodiments, the association relationship between the N transmit beams of the first PUCCH and the N TRPs may be reflected as an association relationship between the N transmit beams of the first PUCCH and the N beam failure recovery configurations. For specific details, refer to the association relationship between the N transmit beams of the first PUCCH and the N sets of beam failure detection resources, and the sets of beam failure detection resources in the first PUCCH are replaced with the beam failure recovery configurations.

In other words, the first transmit beam of the first PUCCH is associated with a first beam failure recovery configuration, the first beam failure recovery configuration includes a second set of candidate beam resources association, the second set of candidate beam resources is a set of candidate beam resources that is associated with the second set of beam failure detection resources in the N sets of candidate beam resources, and the second set of beam failure detection resources corresponds to the second TRP.

In still some embodiments, the association relationship between the N transmit beams of the first PUCCH and the N TRPs may be reflected as an association relationship between the N transmit beams of the first PUCCH and the N CORESET groups or N CORESETPoolIndex. One CORESET group corresponds to one TRP, or one CORESETPoolIndex corresponds to one TRP.

For example, a $1^{st}$ transmit beam of the first PUCCH is associated with CORESETPoolIndex being 0, or associated with a CORESET group with a CORESET group index being 0. A $2^{nd}$ transmit beam of the first PUCCH is associated with CORESETPoolIndex being 1, or associated with a CORESET group with a CORESET group index being 1. That a transmit beam of the first PUCCH is associated with CORESETPoolIndex being C may be understood as follows: The transmit beam of the first PUCCH is associated with a beam failure detection resource, a set of beam failure detection resources, a set of candidate beam resources, or a beam failure recovery configuration whose corresponding CORESETPoolIndex is equal to C, where C is a constant, and represents a value of CORESETPoolIndex.

In an example, CORESETPoolIndex corresponding to a beam failure detection resource is used to identify a CORESET group that implicitly configures a set of beam failure detection resources to which the beam failure detection resource belongs. CORESETPoolIndex corresponding to a set of beam failure detection resources is used to identify a CORESET group that implicitly configures the set of beam failure detection resources. A CORESET group identified by CORESETPoolIndex corresponding to the set of candidate beam resources is used to implicitly configure a set of beam failure detection resources associated with the set of candidate beam resources. The beam failure recovery configuration includes one set of candidate beam resources.

A CORESET group identified by CORESETPoolIndex corresponding to the beam failure recovery configuration is used to implicitly configure a set of beam failure detection resources associated with the set of candidate beam resources.

In other words, the first transmit beam of the first PUCCH is associated with a fourth CORESET group, and the fourth CORESET group is a CORESET group corresponding to the second set of beam failure detection resources. In other words, the fourth CORESET group is used to implicitly configure (or determine) the second set of beam failure detection resources. The second set of beam failure detection resources corresponds to the second TRP.

After receiving the first indication information, the network device may perform the following step S6024.

S6024: The network device sends beam failure recovery response information to the terminal device. Correspondingly, the terminal device receives the beam failure recovery response information from the network device.

In some embodiments, the beam failure recovery response information may be DCI, and a hybrid automatic repeat request (hybrid automatic repeat request, HARQ) process indicated in the DCI is the same as a HARQ process indicated in DCI for scheduling the first indication information. In addition, a new data indicator (new data indicator, NDI) field in the DCI is set to a reversed state.

In some embodiments, after receiving the beam failure recovery response information or after receiving the beam failure recovery response information in Y time units, the terminal device uses the first beam as a common beam of the TRP corresponding to the first CORESET group, or uses the first beam as a transmit beam of one or more of the following: a PDCCH corresponding to the first CORESET group, a PDSCH corresponding to the first CORESET group, a PUCCH corresponding to the first CORESET group, and a physical uplink shared channel (physical uplink shared channel, PUSCH) corresponding to the first CORESET group.

The common beam is a beam jointly corresponding to a plurality of channels, for example, a beam jointly corresponding to the PDCCH and the PDSCH. The PDCCH corresponding to the CORESET group is a PDCCH corresponding to each CORESET in the CORESET group. A PDSCH corresponding to the CORESET group is a PDSCH scheduled by a PDCCH corresponding to each CORESET. The PUSCH corresponding to the CORESET group is a PUSCH scheduled by a PDCCH corresponding to each CORESET. The PUCCH corresponding to the CORESET group is a PUCCH for feeding back acknowledgement (acknowledgement, ACK) or negative acknowledgement (negative acknowledgement, NACK) information of the PDSCH corresponding to the CORESET group.

In an example, a part of or all QCL resources corresponding to the first CORESET group form the first set of beam failure detection resources, or the beam failure detection resources in the first set of beam failure detection resources include a part of or all QCL resources corresponding to the first CORESET group. A part of or all QCL resources corresponding to the first CORESET group are a part of or all QCL resources of the first CORESET group. In other words, the first set of beam failure detection resources is implicitly configured by using the first CORESET group. In other words, the first CORESET group is a CORESET group for determining the first set of beam failure detection resources, and the first set of beam failure detection resources is a set of beam failure detection resources in which a beam failure occurs.

In another example, when the first set of beam failure detection resources is explicitly configured, there is a QCL relationship between any CORESET included in the first CORESET group and a beam failure detection resource in the first set of beam failure detection resources. In other words, the first CORESET group includes all CORESETs that have a QCL relationship with beam failure detection resources in the first set of beam failure detection resources.

It may be understood that, in this case, CORESETs in the first CORESET group are not divided based on CORESET group indexes.

For example, that a CORESET has a QCL relationship with a beam failure detection resource in the first set of beam failure detection resources may be understood as follows: A receive beam used to receive the CORESET is the same as a receive beam used to receive the beam failure detection resource. In other words, a receive beam used to receive a PDCCH transmit beam corresponding to the CORESET is the same as a receive beam used to receive the beam failure detection resource.

Further, in this example, the first set of beam failure detection resources may be limited to including only one beam failure detection resource.

In still another example, the first CORESET group includes all CORESETs configured by the network device for the terminal device.

In an example, the "time unit" in this application may be an OFDM symbol, a slot, a millisecond, or the like, or may be another unit that represents a time. This is not specifically limited.

In an example, a value of Y may be configured by the network device, reported by the terminal device, or specified in a protocol. This is not specifically limited in this application.

In some embodiments, the network device may subsequently reconfigure or activate a transmit beam, and the terminal device may use the transmit beam reconfigured or activated by the network device as the common beam of the TRP corresponding to the first CORESET group, or as the transmit beam of the PDCCH, the PDSCH, the PUSCH, or the PUCCH corresponding to the first CORESET group.

S6023b: The terminal device sends fourth indication information to the network device. Correspondingly, the network device receives the fourth indication information from the terminal device.

The fourth indication information indicates that there is no candidate beam resource whose quality is greater than the second threshold in the set of candidate beam resources. Because a sending manner of the fourth indication information is similar to a sending manner of the first indication information, reference may be made to related descriptions in step S6023a. Details are not described herein again.

It should be noted that the method provided in this application further relates to second indication information and third indication information. This is described in subsequent embodiments. Details are not described herein again.

In this embodiment of this application, the network device configures N sets of beam failure detection resources for one cell. In one aspect, when determining that a beam failure occurs in any set of beam failure detection resources, the terminal device determines, from a set of candidate beam resources associated with the set of beam failure detection resources, a candidate beam resource whose quality is higher than the second threshold, and sends the first indication information to the network device to perform beam failure recovery. Therefore, the terminal device does not need to perform beam failure recovery only when a beam failure occurs in all the N sets of beam failure detection resources. In addition, because each set of beam failure detection resources in the N sets of beam failure detection resources is associated with a set of candidate beam resources in the N sets of candidate beam resources, recovery may be performed for each set of beam failure detection resources. In conclusion, according to the beam failure recovery method provided in this embodiment of this application, beam failure recovery can be performed in time. When the N sets of beam failure detection resources are per-TRP configured, TRP-level beam failure recovery can be implemented. This improves performance of multi-TRP transmission.

In addition, in some embodiments, to enable the network device to learn of a capability of the terminal device, the terminal device may send terminal capability information to the network device.

In an example, the terminal capability information may include one or more of the following:

whether the terminal device supports TRP-level beam failure recovery, where an example in which the terminal supports TRP-level beam failure recovery is used for description in this application;

whether the terminal supports configuration of sets of beam failure detection resources, where an example in which the terminal supports configuration of the sets of beam failure detection resources is used for description in this application;

information about a quantity of sets of beam failure detection resources of which the terminal device supports configuration, for example, information about a quantity of sets of beam failure detection resources that can be configured in a single cell or a bandwidth part (bandwidth part, BWP);

information about a quantity of beam failure detection resources included in a single set of beam failure detection resources;

information about a total quantity of beam failure detection resources included in the plurality of sets of beam failure detection resources;

information about a quantity of CORESETs or QCL resources of CORESETs that are used for beam failure detection, for example, information about a quantity of CORESETs or QCL resources of CORESETs that are used for beam failure detection in a single cell or BWP, where the CORESETs used for beam failure detection may be understood as CORESETs of which the QCL resources are used as the beam failure detection resources;

information about a quantity of CORESETs or QCL resources of CORESETs that are used for beam failure detection in a single CORESET group, or information about a quantity of CORESETs or QCL resources of CORESETs that are used for beam failure detection in a CORESET group corresponding to a CORESET group index;

a total quantity of CORESETs or QCL resources of CORESETs that are used for beam failure detection;

whether the terminal device supports configuration of a plurality of sets of candidate beam resources, where an example in which the terminal supports configuration of a plurality of sets of candidate beam resources is used for description in this application;

information about a quantity of sets of candidate beam resources of which the terminal device supports configuration, for example, information about a quantity of sets of candidate beam resources that can be configured in a single cell or BWP;

information about a quantity of candidate beam resources included in a single set of candidate beam resources;

information about a total quantity of candidate beam resources included in the plurality of sets of candidate beam resources;

whether the terminal device supports an explicit configuration of beam failure detection resources, and whether the terminal device supports an implicit configuration of beam failure detection resources;

whether the terminal device supports an explicit configuration of beam failure detection resources or an implicit configuration of beam failure detection resources;

whether the terminal device supports both cell-level beam failure recovery and TRP-level beam failure recovery;

whether the terminal device supports cell-level beam failure recovery and TRP-level beam failure recovery sharing beam failure detection resources and/or candidate beam resources;

whether the terminal device supports configuration of a plurality of SR resources used for beam failure recovery, where the SR resources used for beam failure recovery are resources used to request the network device to schedule the terminal device to report information about a new beam (for example, the foregoing first beam);

information about a quantity of SR resources of which the terminal device supports configuration and that are used for beam failure recovery; and whether the terminal device supports updating, based on a reported new beam (for example, the foregoing first beam), a TCI-state/TCI-state group corresponding to a TCI field value.

In an example, the quantity information may be a specific quantity value, or may be a value range, or may be an upper quantity limit, or may be a lower quantity limit.

Based on this solution, the terminal device reports the capability information of the terminal device to the network device, so that the network device can learn whether the terminal device supports some functions, for example, whether the terminal device supports TRP-level beam failure recovery; or the network device can learn value information about some parameters, for example, a quantity of beam failure detection resources in the set of beam failure detection resources, or the like. In this way, the network device can perform proper parameter configuration based on the capability information, to improve reasonableness of a beam failure recovery configuration.

In the foregoing process, after a beam failure occurs in a TRP (hereinafter referred to as the first TRP) corresponding to the first set of beam failure detection resources, the terminal device may report the first beam to the network device in time, so that the first beam is used as a transmit beam of the first TRP. However, the first beam may not be simultaneously transmitted with a transmit beam of a second TRP, where the second TRP is a TRP other than the first TRP in the cell.

It may be understood that, in the following embodiment of this application, an example in which whether the first beam and the transmit beam of the second TRP can be simultaneously transmitted is used for description is used. When the cell further includes another TRP except the first TRP and the second TRP, whether the first beam can be simultaneously transmitted with a transmit beam of the another TRP is similar to the description in the following embodiment. For details, refer to the description in the following embodiment. Details are not described in this application.

In an example, when a receive beam corresponding to the first beam is different from a receive beam corresponding to the transmit beam of the second TRP, and the terminal device has only one antenna panel, the terminal device cannot simultaneously receive the first beam and the transmit beam of the second TRP over a plurality of different receive beams. In other words, the first beam and the beam of the second TRP cannot be simultaneously transmitted. The network device may not perceive that the first beam and the beam of the second TRP cannot be simultaneously transmitted. In this case, if the network device still simultaneously sends the first beam and the transmit beam of the second TRP, a transmission error may be caused, and transmission efficiency may be reduced.

Based on this, this application provides the following plurality of solutions.

Solution 1: It may be agreed that the first beam indicated by the terminal device and the second beam needs to meet a first relationship.

The second beam may be understood as the transmit beam of the second TRP.

In a possible implementation, the second beam is a beam corresponding to one or more beam failure detection resources in a second set of beam failure detection resources, and the second set of beam failure detection resources is a set of beam failure detection resources that is different from the first set of beam failure detection resources in N sets of beam failure detection resources. In other words, the second set of beam failure detection resources is a set of beam failure detection resources corresponding to the second TRP.

For example, when N=2, the first set of beam failure detection resources is a set of beam failure detection resources in which a beam failure occurs, and the second set of beam failure detection resources is another set of beam failure detection resources.

In an example, when the second beam is a beam corresponding to a plurality of beam failure detection resources in the second set of beam failure detection resources, the plurality of beam failure detection resources may be L beam failure detection resources with smallest indexes or L beam failure detection resources with largest indexes in the second set of beam failure detection resources, or first L beam failure detection resources, or last L beam failure detection resources. It may be understood that in this case, the second beam is a general name of beams corresponding to the L beam failure detection resources, and may include a plurality of beams. L is a positive integer.

In another possible implementation, the second beam is a PDCCH transmit beam corresponding to a second CORESET group, and the second CORESET group corresponds to the second set of beam failure detection resources, or the second CORESET group is a CORESET group corresponding to the second TRP. A CORESET group index of the second CORESET group is different from a CORESET group index of a CORESET group corresponding to the first TRP.

In an example, when there are a plurality of PDCCH transmit beams corresponding to the second CORESET group, the second beam refers to L PDCCH transmit beams in the plurality of PDCCH transmit beams corresponding to the second CORESET group. The L PDCCH transmit beams may be PDCCH transmit beams corresponding to L CORESETs with smallest indexes, PDCCH transmit beams corresponding to L CORESETs with largest indexes, PDCCH transmit beams corresponding to first L CORESETs, or PDCCH transmit beams corresponding to last L CORESETs in the second CORESET group. It may be understood that in this case, the second beam is a general name of PDCCH transmit beams corresponding to the L CORESETs, and may include a plurality of beams.

In another possible implementation, the second beam is a PDSCH transmit beam of a TRP (that is, the second TRP)

corresponding to the second set of beam failure detection resources. In an example, when the second TRP has a plurality of PDSCH transmit beams, the second beam refers to L PDSCH transmit beams in the plurality of PDSCH transmit beams of the second TRP. The L PDSCH transmit beams may be L of a plurality of PDSCH transmit beams activated by the network device for the second TRP via a MAC CE.

For example, a format of the MAC-CE may be shown in FIG. 1b. In this case, a CORESET group index field in the MAC CE is set to a second CORESET group index. The L PDSCH transmit beams in the plurality of PDSCH transmit beams of the second TRP may be PDSCH transmit beams indicated by L TCI-states with smallest or largest TCI-state indexes in activated TCI-states; or PDSCH transmit beams indicated by L TCI-states corresponding to smallest or largest TCI field values.

Alternatively, for example, a format of the MAC CE may be shown in FIG. 1c. In this case, a plurality of PDSCH transmit beams activated by the MAC CE for the second TRP are PDSCH transmit beams indicated by the TCI-states that correspond to the second TRP and that are in a plurality of TCI-state groups activated by the MAC CE. The L PDSCH transmit beams in the plurality of PDSCH transmit beams of the second TRP may be: PDSCH transmit beams indicated by TCI-states that correspond to the second TRP and that are in L TCI-state groups with smallest or largest TCI-state group indexes, or PDSCH transmit beams indicated by TCI-states that correspond to the second TRP and that are in L TCI-state groups corresponding to smallest or largest TCI field values.

In another possible implementation, the second beam is a common beam of a TRP (that is, the second TRP) corresponding to the second set of beam failure detection resources. The common beam may be, for example, a downlink common beam, an uplink common beam, or an uplink-downlink joint common beam.

In an example, when the second TRP has a plurality of common beams, the second beam refers to L common beams in the plurality of common beams of the second TRP, and the L common beams may be L common beams with smallest indexes, or L common beams with largest indexes, or first L common beams, or last L common beams in the plurality of common beams of the second TRP.

In an example, the value of L may be configured by the network device, or may be reported by the terminal device, or may be specified in a protocol. This is not specifically limited in this application. In addition, for the foregoing different implementations, values of L may be the same or different. This is not limited.

The first relationship includes the following: The first beam and the second beam can be simultaneously received by the terminal device, receive beams corresponding to the first beam and the second beam are the same, or receive antenna panels corresponding to the first beam and the second beam are different.

In an example, because a beam usually corresponds to a resource, for example, a resource corresponding to the first beam is a first resource, and a resource corresponding to the second beam is a second resource, the first relationship includes the following: The first resource and the second resource can be simultaneously received by the terminal device; or receive resources corresponding to the first resource and the second resource are the same, or receive antenna panels corresponding to the first resource and the second resource are different.

In another example, the beam may be embodied as a spatial domain filter, a spatial filter, a spatial domain parameter, a spatial parameter, a spatial domain setting, a spatial setting, QCL information, a QCL assumption, a QCL indication, a TCI-state, a spatial relation, or the like. Therefore, in the description of the first relationship, the beam may alternatively be replaced with the spatial domain filter, the spatial filter, the spatial domain parameter, the spatial parameter, the spatial domain setting, the spatial setting, the QCL information, the QCL assumption, the QCL indication, the TCI-state, the spatial relation, or the like. This is not limited.

Based on this solution, the first beam indicated by the terminal device and the second beam definitely meet the first relationship, that is, the first beam and the second beam can be simultaneously transmitted, and even if the network device simultaneously sends the first beam and the second beam, the terminal device can simultaneously receive the first beam and the second beam. This reduces a probability of a transmission error, and improves transmission efficiency.

Solution 2: In addition to sending the first indication information to the network device, the terminal device may further send second indication information to the network device, where the second indication information indicates whether the first beam and the second beam meet the first relationship.

For the second beam and the first relationship, refer to the foregoing description. Details are not described herein again.

In some possible implementations, both the terminal device and the network device may agree to determine specific beams for the second beam, so that the terminal device only needs to indicate whether the first beam and the second beam meet the first relationship.

In some other possible implementations, the network device does not know specific beams for the second beam. Therefore, in addition to the second indication information, the terminal device may further send information about the second beam to the network device.

In an example, the first indication information and the second indication information may be sent in a same message, or may be sent in different messages. This is not specifically limited in this application.

Based on this solution, the terminal device indicates, to the network device, whether the first beam and the second beam meet the first relationship, so that the network device can determine, based on the indication of the terminal device, whether to simultaneously send the first beam and the second beam. For example, when the first beam and the second beam meet the first relationship, the network device simultaneously sends the first beam and the second beam. When the first beam and the second beam do not meet the first relationship, the network device asynchronously sends the first beam and the second beam. This reduces a probability of a transmission error and improves transmission efficiency.

Solution 3: In addition to sending the first indication information to the network device, the terminal device may further send third indication information to the network device, where the third indication information indicates information about the second beam that meets the first relationship with the first beam. In other words, the terminal device reports, to the network device, specific transmit beams of the second TRP that can meet the first relationship with the first beam.

In a possible implementation, when transmit beams of the second TRP are PDCCH transmit beams corresponding to a second CORESET group, when there are a plurality of PDCCH transmit beams corresponding to the second CORESET group, and when there are X PDCCH transmit beams that are in the plurality of PDCCH transmit beams and that meet the first relationship with the first beam, the X PDCCH transmit beams are second beams. The terminal device may report information about the X PDCCH transmit beams in the third indication information.

For example, the information about the X PDCCH transmit beams may be indexes of CORESETs respectively corresponding to the X PDCCH transmit beams, or TCI state indexes respectively corresponding to the X PDCCH transmit beams, or reference signal identifiers in TCI states respectively corresponding to the X PDCCH transmit beams. X is a positive integer greater than or equal to 1.

In another possible implementation, when transmit beams of the second TRP are a plurality of PDSCH transmit beams of the second TRP, and when there are X PDSCH transmit beams that are in the plurality of PDSCH transmit beams and that meet the first relationship with the first beam, the X PDSCH transmit beams are second beams. The terminal device may report information about the X PDSCH transmit beams in the third indication information.

For example, the information about the X PDSCH transmit beams may be: TCI state indexes respectively corresponding to the X PDSCH transmit beams, or reference signal identifiers in TCI states respectively corresponding to the X PDSCH transmit beams, or TCI field values corresponding to TCI state indexes respectively corresponding to the X PDSCH transmit beams, or indexes of beam groups (or referred to as TCI state groups) to which the X PDSCH transmit beams respectively belong, or TCI field values corresponding to beam groups to which the X PDSCH transmit beams respectively belong, or partial indexes of the X PDSCH transmit beams in the plurality of PDSCH transmit beams of the second TRP. For example, the second TRP activates four PDSCH transmit beams, and indexes of the four PDSCH transmit beams are respectively 0, 1, 2, and 3. If a PDSCH transmit beam 2 in the four PDSCH transmit beams meets the first relationship with the first beam, the terminal device may report the index 2 of the PDSCH transmit beam 2 in the third indication information.

For example, when the information about the X PDSCH transmit beams is indexes of beam groups to which the X PDSCH transmit beams respectively belong, or TCI field values corresponding to beam groups to which the X PDSCH transmit beams respectively belong, the terminal device may further update the beam groups to which the X PDSCH transmit beams respectively belong. For example, a PDSCH transmit beam 1 in the X PDSCH transmit beams is used as an example. The terminal device may replace, with the PDSCH transmit beam 1, a beam that corresponds to the second TRP in a beam group to which the PDSCH transmit beam 1 belongs.

The following provides a description by using specific examples. Refer to Table 1. It is assumed that the network device activates a beam group (or referred to as a TCI state group) 1 and a beam group 2 in total via a MAC CE. A TCI field value corresponding to the beam group 1 is 0, the beam group 1 includes a beam group 1 and a beam 3, and the beam group 1 and the beam 3 respectively correspond to a TRP 1 and a TRP 2. A TCI field value corresponding to the beam group 2 is 1, the beam group 2 includes a beam 0 and a beam 2, and the beam 0 and the beam 2 respectively correspond to the TRP 1 and the TRP 2. When the network device sends DCI signaling to the terminal device, and a value of a TCI field in the DCI is set to 1, the terminal device may determine that the TRP 1 and the TRP 2 perform transmission over the beam 0 and the beam 2.

It is assumed that in a process in which the TRP 1 and the TRP 2 perform transmission over the beam 0 and the beam 2, a beam failure occurs on the TRP 2. When determining that quality of a beam 4 corresponding to the TRP 2 is greater than a second threshold, the terminal device reports information indicating the beam 4. In this case, the beam 4 may be considered as a first beam. In addition, it is assumed that the terminal device determines that the beam 4 and the beam 0 meet the first relationship, the terminal device may report information about the beam 0 in the third indication information.

Specifically, the terminal device may report a TCI state index (a TCI state index 0) corresponding to the beam 0, or may report a TCI field value (a field value 1) corresponding to a beam group to which the beam 0 belongs, or may report a partial index (for example, an index 0) of the beam 0 in a plurality of beams (a beam 0 and a beam 1) corresponding to the TRP 1, or may report an index (a beam group index 1) of a beam group to which the beam 0 belongs.

Further, after sending the information about the beam 0 to the network device, the terminal device may update the beam group to which the beam 0 belongs, that is, update beams included in the beam group 1. For example, a beam corresponding to the TRP 2 in the beam group 1 is replaced with the beam 4, that is, the beam group 1 is replaced from $\{0, 2\}$ to $\{0, 4\}$. In other words, the beam group corresponding to the TCI field value 1 is updated to $\{0, 4\}$. After the update, for a correspondence between a TCI field value and a beam group, refer to Table 2.

TABLE 1

| Beam group index | TCI field value | Beam (or TCI state index) |
| --- | --- | --- |
| 0 | 0 | $\{1, 3\}$ |
| 1 | 1 | $\{0, 2\}$ |

TABLE 2

| Beam group index | TCI field value | Beam (or TCI state index) |
| --- | --- | --- |
| 0 | 0 | $\{1, 3\}$ |
| 1 | 1 | $\{0, 4\}$ |

In another possible implementation, when transmit beams of the second TRP are a plurality of common beams of the second TRP, and when there are X common beams that are in the plurality of common beams and that meet the first relationship with the first beam, the X common beams are second beams. The terminal device may report the information about the X common beams in the third indication information, for example, TCI state indexes corresponding to the common beams or reference signal identifiers in TCI states corresponding to the common beams.

In another possible implementation, when transmit beams of the second TRP are beams corresponding to a plurality of beam failure detection resources in the second set of beam failure detection resources, and when there are beams that correspond to X beam failure detection resources in the plurality of beam failure detection resources and that meet the first relationship with the first beam, the beams corresponding to the X beam failure detection resources are second beams. The terminal device may report information about the X beam failure detection resource, for example, indexes of the beam failure detection resources, in the third indication information.

In an example, the value of X may be configured by the network device, or may be reported by the terminal device, or may be specified in a protocol. This is not specifically limited in this application. In addition, for the foregoing different implementations, values of X may be the same or may be different. This is not limited.

Based on this solution, the terminal device sends, to the network device, the information about the second beam that meets the first relationship with the first beam, so that the network device can simultaneously send the first beam and the second beam, and asynchronously send the first beam and another beam in the transmit beams of the second TRP other than the second beam. This reduces a probability of a transmission error and improves transmission efficiency.

Solution 4: In addition to sending the first indication information to the network device, the terminal device may further send, to the network device, information about a receive beam corresponding to the first beam and/or information about a receive antenna panel corresponding to the first beam, for example, an antenna panel index or a resource index or resource set index corresponding to an antenna panel.

Correspondingly, after receiving the information about the receive beam corresponding to the first beam, the network device may determine whether the receive beam corresponding to the first beam is the same as the receive beam corresponding to the second beam. If the receive beam corresponding to the first beam is the same as the receive beam corresponding to the second beam, the network device determines that the first beam and the second beam can be simultaneously transmitted. If the receive beam corresponding to the first beam is different from the receive beam corresponding to the second beam, when the terminal device further reports the information about the receive antenna panel corresponding to the first beam, the network device may further determine whether the receive antenna panel corresponding to the first beam is the same as a receive antenna panel corresponding to the second beam. If the receive antenna panel corresponding to the first beam is the same as the receive antenna panel corresponding to the second beam, the network device determines that the first beam and the second beam can be simultaneously transmitted. If the receive antenna panel corresponding to the first beam is different from the receive antenna panel corresponding to the second beam, the network device determines that the first beam and the second beam cannot be simultaneously transmitted, so that the first beam and the second beam are sent in a different time. This reduces a probability of a transmission error and improves transmission efficiency.

Solution 5: In addition to sending the first indication information to the network device, the terminal device may further send fifth indication information to the network device. The fifth indication information indicates whether the receive beam corresponding to the first beam is the same as the receive beam corresponding to the second beam. If the receive beam corresponding to the first beam is the same as the receive beam corresponding to the second beam, the fifth indication information further indicates whether a receive antenna panel corresponding to the first beam is the same as a receive antenna panel corresponding to the second beam.

Correspondingly, after receiving the fifth indication information, the network device may determine, based on the fifth indication information, whether the first beam and the second beam can be simultaneously transmitted. For details, refer to the description in Solution 4. Details are not described herein again.

Solution 6: In addition to sending the first indication information to the network device, the terminal device may further send sixth indication information to the network device, where the sixth indication information indicates whether a receive antenna panel corresponding to the first beam is the same as a receive antenna panel corresponding to the second beam. If the receive antenna panel corresponding to the first beam is the same as the receive antenna panel corresponding to the second beam, the sixth indication information further indicates whether a receive beam corresponding to the first beam is the same as a receive beam corresponding to the second beam.

Correspondingly, after receiving the sixth indication information, the network device may determine, based on the sixth indication information, whether the first beam and the second beam can be simultaneously transmitted. For details, refer to the description in Solution 4. Details are not described herein again.

In conclusion, in Solution 2 to Solution 6, the terminal device may send the indication information to the network device, so that the network device determines whether to simultaneously send the first beam and the second beam. The foregoing solution 1 specifies that the first beam and the second beam need to meet the first relationship. It may be understood as a limitation on selecting the first beam by the terminal device. In addition, this application further provides a method for the terminal device to determine whether the first beam and the second beam need to meet the first relationship.

It should be noted that "whether the first beam and the second beam need to meet the first relationship" in this application may also be described as: whether the first beam has a requirement of meeting the first relationship with the second beam. The two may be mutually replaced. This is not specifically limited in this application.

In some embodiments, the terminal device may determine, based on third configuration information, whether the first beam and the second beam need to meet the first relationship. The third configuration information includes one or more of relationship configuration information, multi-TRP transmission mode configuration information, and beam measurement configuration information. The relationship configuration information indicates whether the first beam and the second beam need to meet the first relationship.

In some embodiments, the relationship configuration information may be a configuration parameter included in the foregoing first configuration information. In other words, the network device indicates, in the first configuration information, whether the first beam and the second beam need to meet the first relationship.

In an example, when the third configuration information is the relationship configuration information, that the terminal device determines, based on the relationship configuration information, whether the first beam and the second beam need to meet the first relationship may include: when the relationship configuration information indicates that the first beam and the second beam need to meet the first relationship, determining that the first beam and the second beam need to meet the first relationship, where the first beam indicated by the terminal device and the second beam meet the first relationship; or when the relationship configuration information indicates that the first beam and the second beam do not meet the first relationship, determining that the first beam and the second beam do not need to meet the first relationship, where the first beam indicated by the terminal device and the second beam may not meet the first relationship. In other words, the network device may configure whether the first beam indicated by the terminal device and the second beam need to meet the first relationship in TRP-level beam failure recovery.

In another example, when the third configuration information is the multi-TRP transmission mode configuration information, that the terminal device determines, based on the relationship configuration information, whether the first beam and the second beam need to meet the first relationship may include: when a transmission mode configured in the multi-TRP transmission mode configuration information is a frequency division multiplexing (frequency division multiplexing, FDM) mode, determining that the first beam and the second beam need to meet the first relationship, where the first beam indicated by the terminal device and the second beam meet the first relationship; or when a transmission mode configured in the multi-TRP transmission mode configuration information is not a frequency division multiplexing FDM mode, determining that the first beam and the second beam do not need to meet the first relationship. The first beam indicated by the terminal device and the second beam may not meet the first relationship.

In still another example, when the third configuration information is beam measurement configuration information, that the terminal device determines, based on the relationship configuration information, whether the first beam and the second beam need to meet the first relationship may include: when a first parameter of the beam measurement configuration information is configured to be enabled, determining that the first beam and the second beam need to meet the first relationship, where the first beam indicated by the terminal device and the second beam meet the first relationship; or when a first parameter of the beam measurement configuration information is configured to be disabled, determining that the first beam and the second beam do not need to meet the first relationship, where the first beam indicated by the terminal device and the second beam may not meet the first relationship, and the first parameter is used to configure whether to perform grouping reporting.

For example, the beam measurement configuration information may be information carried in a report configuration (reportConfig) information element, and the first parameter may be a group-based beam reporting (groupBasedBeamReporting) parameter.

A manner in which the terminal device determines whether the first beam and the second beam need to meet the first relationship when the third configuration information is the relationship configuration information, the multi-TRP transmission mode configuration information, or the beam measurement configuration information respectively is used for description. It may be understood that the terminal device may alternatively perform determining with reference to a plurality of types of configuration information in the relationship configuration information, the multi-TRP transmission mode configuration information, and the beam measurement configuration information.

In an example, when the third configuration information is the multi-TRP transmission mode configuration information and the beam measurement configuration information, that the terminal device determines, based on the relationship configuration information, whether the first beam and the second beam need to meet the first relationship may include: when a transmission mode configured in the multi-TRP transmission mode configuration information is a frequency division multiplexing FDM mode, and a first parameter of the beam measurement configuration information is configured to be enabled, determining that the first beam and the second beam need to meet the first relationship.

In some implementation scenarios, a method for determining, by the terminal device, whether the first beam and the second beam need to meet the first relationship may be used in combination with the foregoing Solution 2 to Solution 6.

In an example, after determining whether the first beam and the second beam need to meet the first relationship, the terminal device may perform the foregoing solution 2 to report a determining result of the terminal device to the network device.

In another example, after determining that the first beam and the second beam need to meet the first relationship, the terminal device may perform the foregoing solution 3 to report the information about the second beam to the network device.

In some embodiments, the terminal device detects that a beam failure occurs on the first TRP and beam failure recovery is performed, but before beam failure recovery is completed, the network device indicates one beam group (or TCI-state group) to the terminal device via DCI. In this case, the terminal device ignores the beam corresponding to the first TRP in the beam group, and continues to perform beam failure recovery for the first TRP. In addition, the terminal device receives the second TRP over a receive beam corresponding to the beam that corresponds to the second TRP in the beam group.

For example, a beam failure occurs on the first TRP, and before the beam failure recovery of the first TRP is completed, the beam group indicated by the network device by using the TCI field in the DCI includes the beam 1 and the beam 3, and the beam 1 and the beam 3 respectively correspond to the first TRP and the second TRP. After receiving the DCI, the terminal device ignores the beam 1 indicated by the network device, and continues to perform beam failure recovery for the first TRP. In addition, the terminal device receives the second TRP over a receive beam corresponding to the beam 3, that is, a receive beam 3.

The foregoing is related description of TRP-level beam failure recovery provided in this application. Generally, TRP-level beam failure recovery provided in this application may be summarized as: configuring a plurality of sets of beam failure detection resources and a plurality of sets of candidate beam resources, using a set of beam failure detection resources as a granularity, determining, based on each set of beam failure detection resources, whether a beam failure occurs in the set of beam failure detection resources or the TRP corresponding to the set of beam failure detection resources, and when a beam failure occurs in the set of beam failure detection resources or the TRP corresponding to the set of beam failure detection resources, indicating that a beam corresponding to a candidate beam resource whose quality is greater than a second threshold in a set of candidate beam resources corresponding to the set of beam failure detection resources is used as a new beam of the TRP. Further, the terminal device may be limited to indicating, in TRP-level beam failure recovery, the new beam via a MAC CE.

In addition, this application further considers a problem of how to support both TRP-level beam failure recovery and cell-level beam failure recovery. Based on this, a beam failure recovery method shown in FIG. 8 is provided.

Figure 8:
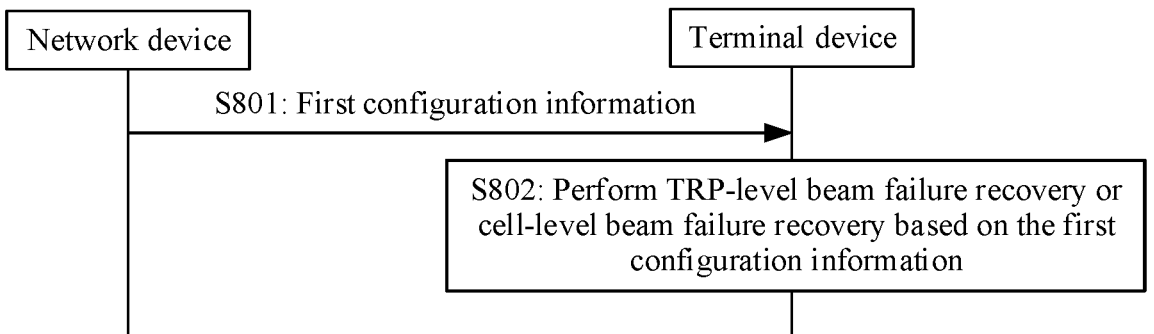
FIG. 8 is a schematic flowchart of still another beam failure recovery method according to this application.

Refer to FIG. 8. The beam failure recovery method includes the following steps.

S801: A network device sends first configuration information to a terminal device. Correspondingly, the terminal device receives the first configuration information from the network device.

The first configuration information is used to configure N sets of beam failure detection resources and N sets of candidate beam resources, and N is a positive integer greater than 1. For details, refer to descriptions in the method shown in FIG. 6. Details are not described herein again.

When a problem of how to simultaneously support TRP-level beam failure recovery and cell-level beam failure recovery is considered, the network device may send the first configuration information in the following two scenarios.

Scenario 1: When the first configuration information and the second configuration information cannot be configured together, or when both the first configuration information and the second configuration information cannot be configured, the network device chooses to configure the first configuration information. In other words, when the first configuration information is configured, the second configuration information cannot be configured.

The second configuration information is used to configure one set of beam failure detection resources and one set of candidate beam resources. The second configuration information is used for cell-level beam failure recovery. Correspondingly, the second configuration information may also be referred to as "cell-level beam failure recovery configuration information".

Scenario 2: When the first configuration information and the second configuration information can be configured together, or when both the first configuration information and the second configuration information can be configured, the network device chooses to configure the first configuration information, but the second configuration information may be configured or not configured.

S802: The terminal device performs cell-level beam failure recovery or TRP-level beam failure recovery based on the first configuration information.

In the foregoing scenario 1, when the network device chooses to configure the first configuration information, the network device cannot configure the second configuration information, that is, the terminal device does not receive the second configuration information. In this case, the terminal device may perform cell-level beam failure recovery or TRP-level beam failure recovery based on the first configuration information.

In a possible implementation, the terminal device may detect quality of beam failure detection resources in the N sets of beam failure detection resources. When all beam failure detection resources in a single set of beam failure detection resources are less than the first threshold, it is determined that a TRP-level beam failure occurs and a partial beam failure occurs, and then beam failure recovery is performed for the TRP-level beam failure. A specific process is similar to that of the step S602, and a difference lies in the following: In this scenario, the terminal device is limited to sending the first indication information to the network device via the MAC CE. For details, refer to the foregoing related description. Details are not described herein again.

When quality of all beam failure detection resources in the N sets of beam failure detection resources is less than a first threshold, it is determined that a cell-level beam failure occurs, in other words, it is determined that a beam failure occurs in all the N sets of beam failure detection resources, and then beam failure recovery is performed for the cell-level beam failure.

In an example, that the terminal device performs cell-level beam failure recovery based on the first configuration information may include the following steps S8021*a* and S8022*a*.

S8021*a*: When the quality of all beam failure detection resources in the N sets of beam failure detection resources is less than the first threshold, a layer-1 entity of the terminal device sends beam failure indication information to an upper-layer entity of the terminal device.

For example, when N is equal to 2, when the two sets of beam failure detection resources configured by the network device are a set of beam failure detection resources 1 and a set of beam failure detection resources 2, when quality of all beam failure detection resources in the set of beam failure detection resources 1 is less than the first threshold, and when quality of all beam failure detection resources in the set of beam failure detection resources 2 is less than the first threshold, the layer-1 entity of the terminal device sends the beam failure indication information to the upper-layer entity of the terminal device.

In an example, the beam failure indication information may include information about a set of beam failure detection resources in which a beam failure occurs, and/or a beam failure type. When the quality of all the beam failure detection resources in the N sets of beam failure detection resources is less than the first threshold, the beam failure type is the cell-level beam failure. For information about the set of beam failure detection resources on which the beam failure occurs, refer to related descriptions in step S6022. Details are not described herein again.

Further, the beam failure indication information may further include information indicating a first candidate beam resource, where the first candidate beam resource is a candidate beam resource whose quality is greater than a second threshold in the N sets of candidate beam resources. In this case, the following step S8022*a* may be performed. Certainly, when there is the first candidate beam resource, even if the beam failure indication information does not include the information indicating the first candidate beam resource, the following step S8022*a* may be performed. In other words, the step S8022*a* may be performed as long as the first candidate beam resource exists.

It may be understood that there may also be no candidate beam resource whose quality is greater than the second threshold in the N sets of candidate beam resources. In this case, the terminal device may send information to the network device, to notify the network device that there is no candidate beam resource whose quality is greater than the second threshold in the N sets of candidate beam resources.

It should be noted that step S8021*a* is an optional step, that is, the terminal device may not perform step S8021*a*.

S8022*a*: The terminal device sends the first indication information to the network device. Correspondingly, the network device receives the first indication information from the terminal device.

The first indication information indicates a first beam corresponding to the first candidate beam resource.

In an example, the terminal device may send the first indication information to the network device via a message 1 (Msg1) in a random access process or a message 3 (Msg3) in a random access process.

After receiving the first indication information, the network device may send beam failure recovery response information to the terminal device. Then, the network device may send data to the terminal device over the first beam indicated by the first indication information.

In conclusion, when the terminal device does not receive the cell-level beam failure recovery configuration information, that is, the second configuration information, the terminal device may perform cell-level beam failure recovery based on the first configuration information. Specifically, a beam failure detection resource in the N sets of beam failure detection resources may be used for cell-level beam failure detection, and a candidate beam resourced may be selected from the N sets of candidate beam resources, to perform cell-level beam failure recovery.

In the foregoing scenario 2, when the network device chooses to configure the first configuration information, the network device may configure the second configuration information, or may not configure the second configuration information.

In some embodiments, when the network device does not configure the second configuration information, an implementation of the terminal device is the same as that in the foregoing scenario 1. For details, refer to the foregoing related description. Details are not described herein again.

In some other embodiments, when the network device configures the second configuration information, an implementation of the terminal device is also the same as that in the foregoing scenario 1, that is, cell-level beam failure recovery may still be performed based on the first configuration information, that is, the first configuration information has a higher priority than the second configuration information.

In still some embodiments, when the network device configures the second configuration information, that is, when the terminal device receives the second configuration information, the terminal device performs TRP-level beam failure recovery based on the first configuration information. A specific process is similar to that of step S602, and a difference lies in the following: In this scenario, the terminal device is limited to sending the first indication information to the network device via the MAC CE. For details, refer to the foregoing related description. Details are not described herein again. Alternatively, the terminal device may perform cell-level beam failure recovery based on the first configuration information and the second configuration information.

In a possible implementation, the terminal device may detect quality of beam failure detection resources in the N sets of beam failure detection resources configured in the first configuration information and in one set of beam failure detection resources configured in the second configuration information. When all beam failure detection resources in a single set of beam failure detection resources configured in the first configuration information are less than a first threshold, it is determined that a TRP-level beam failure occurs, and then beam failure recovery is performed for the TRP-level beam failure.

When the quality of all beam failure detection resources in the N sets of beam failure detection resources configured in the first configuration information and in one set of beam failure detection resources configured in the second configuration information is less than a first threshold, it is determined that a cell-level beam failure occurs, and then beam failure recovery is performed for the cell-level beam failure.

In an example, that the terminal device performs cell-level beam failure recovery based on the first configuration information and the second configuration information may include the following steps S8021b and S8022b.

S8021b: When quality of all beam failure detection resources in one set of beam failure detection resources configured in the second configuration information and in the N sets of beam failure detection resources configured in the first configuration information is less than the first threshold, the layer-1 entity of the terminal device sends the beam failure indication information to the upper-layer entity of the terminal device.

For example, when one set of beam failure detection resources configured in the second configuration information is a set of beam failure detection resources #I, when two sets of beam failure detection resources configured in the first configuration information are a set of beam failure detection resources 1 and a set of beam failure detection resources 2, when quality of all beam failure detection resources in the set of beam failure detection resources #I is less than the first threshold, when quality of all beam failure detection resources in the set of beam failure detection resources 1 is less than the first threshold, and when quality of all beam failure detection resources in the set of beam failure detection resources 2 is less than the first threshold, the layer-1 entity of the terminal device sends the beam failure indication information to the upper-layer entity of the terminal device.

In an example, the beam failure indication information may include information about a set of beam failure detection resources in which a beam failure occurs, and/or a beam failure type. It should be understood that in this scenario, the beam failure type is a cell-level beam failure. For information about the set of beam failure detection resources on which the beam failure occurs, refer to related descriptions in step S6022. Details are not described herein again.

Further, the beam failure indication information may further include information indicating a first candidate beam resource, where the first candidate beam resource is a candidate beam resource whose quality is greater than the second threshold in the N sets of candidate beam resources configured in the first configuration information or in one set of candidate beam resources configured in the second configuration information. In this case, the following step S8022b may be performed. Certainly, when there is the first candidate beam resource, even if the beam failure indication information does not include the information indicating the first candidate beam resource, the following step S8022b may be performed. In other words, step S8022b may be performed as long as the first candidate beam resource exists.

In an example, the first candidate beam resource may be determined by the terminal device from the N sets of candidate beam resources configured in the first configuration information and one set of candidate beam resources configured in the second configuration information after determining that a cell-level beam failure occurs; or may be determined by the terminal device at another time from the N sets of candidate beam resources configured in the first configuration information and one set of candidate beam resources configured in the second configuration information. This is not specifically limited in this application.

It may be understood that there may be no candidate beam resource whose quality is greater than the second threshold in the N sets of candidate beam resources configured in the first configuration information and in one set of candidate beam resources configured in the second configuration information. In this case, the terminal device may send information to the network device, to notify the network device that there is no candidate beam resource whose quality is greater than the second threshold in the N sets of candidate beam resources configured in the first configuration information and one set of candidate beam resources configured in the second configuration information.

It should be noted that step S8021*b* is an optional step, that is, the terminal device may not perform step S8021*b*.

S8022*b*: The terminal device sends the first indication information to the network device. Correspondingly, the network device receives the first indication information from the terminal device.

The first indication information indicates a first beam corresponding to the first candidate beam resource. For details, refer to related descriptions in step S8022*a*. Details are not described herein again.

In conclusion, when receiving the first configuration information and the second configuration information, the terminal device may perform cell-level beam failure recovery only based on the first configuration information, or may perform cell-level beam failure recovery based on the first configuration information and the second configuration information.

In addition, when receiving the first configuration information and the second configuration information, the terminal device may alternatively perform cell-level beam failure recovery based only on the second configuration information. To be specific, when quality of all beam failure detection resources in one set of beam failure detection resources configured in the second configuration information is less than the first threshold, the layer-1 entity of the terminal device sends beam failure indication information to the upper-layer entity, and the terminal device sends first indication information to the network device, where the first indication information indicates a first beam corresponding to a first candidate beam resource, and the first candidate beam resource is a candidate beam resource whose quality is greater than the second threshold in one set of candidate beam resources configured in the second configuration information.

In some embodiments, when a cell sends data to the terminal device by using two TRPs, a case is further considered in this application: When TRP-level beam failure recovery is currently being performed, that is, when it is detected that a beam failure occurs in a set of beam failure detection resources and beam failure recovery is triggered, and when the beam failure response is not received, it is detected that a beam failure occurs in another set of beam failure detection resources. In this case, a beam failure occurs in both sets of beam failure detection resources, and it may be considered that a cell-level beam failure occurs. Therefore, TRP-level beam failure recovery and cell-level beam failure recovery may conflict. Based on this, this application provides the following two methods to resolve the conflict.

Method 1: Immediately stop a TRP-level beam failure recovery process and start a cell-level beam failure recovery process.

Method 2: Start a cell-level beam failure recovery process without stopping the TRP-level beam failure recovery process.

In other words, the TRP-level beam failure recovery process and the cell-level beam failure recovery process are simultaneously performed, and the beam failure recovery is considered successful regardless of a beam failure response that corresponds to either of the processes and that the terminal device receives. Then, in a subsequent period of time, a beam reported in the beam failure recovery process corresponding to the beam failure response is used as a transmit beam of a PDCCH or a PUCCH.

If the terminal device receives a beam failure response corresponding to the TRP-level beam failure recovery process and a beam failure response corresponding to the cell-level beam failure recovery process, the terminal device may select a beam reported in one of the beam failure recovery processes as a transmit beam of a PDCCH or a PUCCH in a subsequent period of time. For example, a beam reported in a beam failure recovery process corresponding to a first received beam failure response may be selected, or a beam reported in a beam failure recovery process corresponding to a later received beam failure response may be selected.

In an example, a start time of the subsequent period of time may be a time at which the terminal device receives the beam failure response, or a time obtained by adding a time offset to the time at which the terminal device receives the beam failure response. An end time of the subsequent period of time may be a time at which the terminal device receives beam activation signaling for the first time after the start time.

It may be understood that the foregoing two methods may be properly modified to be applicable to a scenario in which a cell sends data to a terminal device by using a plurality of TRPs. For example, when TRP-level beam failure recovery is currently being performed, but no beam failure response is received, and when it is detected that beam failures occur in all other sets of beam failure detection resources, a method similar to the foregoing method 1 or method 2 may be used to resolve a possible conflict.

Based on the foregoing solution, a configuration manner of the first configuration information and the second configuration information, and various beam failure recovery solutions performed by the terminal device when the two types of beam failure recovery configuration information are separately configured or jointly configured are provided. In this way, TRP-level beam failure recovery and cell-level beam failure recovery are simultaneously supported. In other words, TRP-level beam failure recovery and cell-level beam failure recovery are compatible. This effectively improves smooth system evolution.

In various embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

It may be understood that in the foregoing embodiments, a method and/or a step that are/is implemented by the terminal device may be implemented by a component (for example, a chip or a circuit) that can be used in the terminal device, and a method and/or a step that are/is implemented by the network device may be implemented by a component (for example, a chip or a circuit) that can be used in the network device.

The foregoing mainly describes the solutions provided in this application from the perspective of interaction between devices. Correspondingly, an embodiment further provides a communication apparatus, and the communication apparatus is configured to implement the foregoing methods. The communication apparatus may be the terminal device in the foregoing method embodiments, or an apparatus including the foregoing terminal device, or a component that can be used in the terminal device.

It may be understood that, to implement the foregoing functions, the communication apparatus includes a hardware structure and/or a software module for performing a corresponding function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 9:
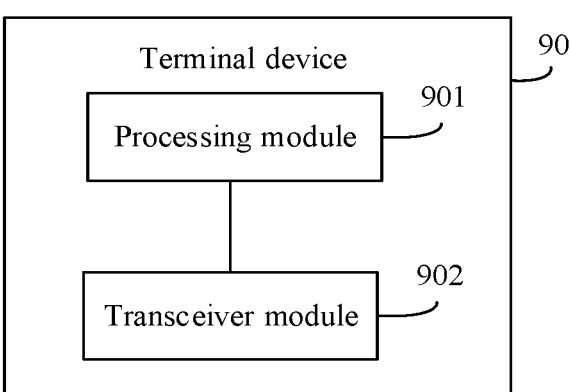
FIG. 9 is a schematic diagram of a structure of another terminal device according to this application.

In an implementation scenario, for example, the communication apparatus is the terminal device in the foregoing method embodiment. FIG. 9 is a schematic diagram of a structure of a terminal device 90. The terminal device 90 includes a processing module 901 and a transceiver module 902.

In some embodiments, the terminal device 90 may further include a storage module (not shown in FIG. 9), configured to store program instructions and data.

In some embodiments, the transceiver module 902 may also be referred to as a transceiver unit, and is configured to implement a sending function and/or a receiving function. The transceiver module 902 may include a transceiver circuit, a transceiver machine, a transceiver, or a communication interface.

In some embodiments, the transceiver module 902 may include a receiving module and a sending module, respectively configured to perform receiving and sending steps performed by the terminal device in the foregoing method embodiments, and/or another process configured to support the technology described in this specification. The processing module 901 may be configured to perform processing (for example, determining and obtaining) steps performed by the terminal device in the foregoing method embodiments, and/or another process configured to support the technology described in this specification.

In an example, the transceiver module 902 is configured to receive first configuration information from the network device, where the first configuration information is used to configure N sets of beam failure detection resources and N sets of candidate beam resources, and N is a positive integer greater than 1. The processing module 901 is configured to perform cell-level beam failure recovery or TRP-level beam failure recovery based on the first configuration information.

In a possible implementation, when the second configuration information is not received, the processing module 901 is configured to perform cell-level beam failure recovery based on the first configuration information, where the second configuration information is used to configure one set of beam failure detection resources and one set of candidate beam resources.

In a possible implementation, that the processing module 901 is configured to perform cell-level beam failure recovery based on the first configuration information includes:

The processing module 901 is configured to determine that quality of all beam failure detection resources in the N sets of beam failure detection resources configured in the first configuration information is less than a first threshold; and the processing module 901 is further configured to send first indication information to the network device by using the transceiver module 902, where the first indication information indicates a first beam corresponding to the first candidate beam resource; and the first candidate beam resource is a candidate beam resource whose quality is greater than the second threshold in the candidate beam resources included in the N sets of candidate beam resources configured in the first configuration information.

In a possible implementation, when the second configuration information is received, the processing module 901 is configured to perform cell-level beam failure recovery based on the first configuration information and the second configuration information, where the second configuration information is used to configure one set of beam failure detection resources and one set of candidate beam resources.

In a possible implementation, the transceiver module 902 is configured to receive second configuration information from the network device. That the processing module 901 is configured to perform cell-level beam failure recovery based on the first configuration information includes: The processing module 901 is configured to determine that quality of all beam failure detection resources in one set of beam failure detection resources configured in the second configuration information and in the N sets of beam failure detection resources configured in the first configuration information is less than the first threshold; and the processing module 901 is further configured to send first indication information to the network device by using the transceiver module 902, where the first indication information indicates a first beam corresponding to a first candidate beam resource, and the first candidate beam resource is a candidate beam resource whose quality is greater than the second threshold in one set of candidate beam resources configured in the second configuration information or in candidate beam resources included in the N sets of candidate beam resources configured in the first configuration information.

In a possible implementation, that the processing module 901 is configured to perform TRP-level beam failure recovery based on the first configuration information includes: the processing module 901 is configured to: quality of all beam failure detection resources in a first set of beam failure detection resources is less than a first threshold; and the processing module 901 is further configured to send first indication information to the network device by using the transceiver module 902, where the first indication information indicates a first beam corresponding to a first candidate beam resource, and the first candidate beam resource is a candidate beam resource whose quality is greater than a second threshold in a first set of candidate beam resources.

The first set of beam failure detection resources is one of the N sets of beam failure detection resources, and the set of candidate beam resources is a set of candidate beam resources that is associated with the first set of beam failure detection resources in the N sets of candidate beam resources.

In a possible implementation, the processing module 901 is further configured to control the layer-1 entity of the terminal device to send beam failure indication information to the upper-layer entity of the terminal device.

In a possible implementation, that the processing module 901 is further configured to send first indication information to the network device by using the transceiver module 902 includes: The processing module 901 is further configured to send, by using the transceiver module 902, a scheduling request SR to the network device over a first transmit beam of N transmit beams of a PUCCH, where the SR is used to request the network device to schedule an uplink transmission resource, and the processing module 901 is further configured to send a MAC CE to the network device on the uplink transmission resource by using the transceiver module 902, where the MAC CE includes the first indication information. The first transmit beam is associated with a second set of beam failure detection resources, a second set of candidate beam resources, or a fourth CORESET group. The second set of beam failure detection resources is a set of beam failure detection resources that is different from the first set of beam failure detection resources in the N sets of beam failure detection resources. The second set of candidate beam resources is associated with the second set of beam failure detection resources. The fourth CORESET group is a CORESET group corresponding to the second set of beam failure detection resources.

In a possible implementation, the processing module 901 is further configured to determine, based on third configuration information, whether the first beam and the second beam need to meet the first relationship, where the third configuration information includes one or more of the following: relationship configuration information, multi-TRP transmission mode configuration information, or beam measurement configuration information.

In a possible implementation, when the first configuration information is the multi-TRP transmission mode configuration information, that the processing module 901 is further configured to determine, based on the multi-TRP transmission mode configuration information, whether the first beam and the second beam need to meet the first relationship includes: The processing module 901 is further configured to: when the transmission mode configured in the multi-TRP transmission mode configuration information is the frequency division multiplexing FDM mode, determine that the first beam and the second beam need to meet the first relationship; or the processing module 901 is further configured to: when the transmission mode configured in the multi-TRP transmission mode configuration information is not the frequency division multiplexing FDM mode, determine that the first beam and the second beam do not need to meet the first relationship.

In a possible implementation, when the first configuration information is the relationship configuration information, that the processing module 901 is further configured to determine, based on the relationship configuration information, whether the first beam and the second beam need to meet the first relationship includes: The processing module 901 is further configured to: when the relationship configuration information indicates that the first beam and the second beam need to meet the first relationship, determine that the first beam and the second beam need to meet the first relationship; and the processing module 901 is further configured to: when the relationship configuration information indicates that the first beam and the second beam do not meet the first relationship, determine that the first beam and the second beam do not need to meet the first relationship.

In a possible implementation, when the first configuration information is the beam measurement configuration information, that the processing module 901 is further configured to determine, based on the beam measurement configuration information, whether the first beam and the second beam need to meet the first relationship includes: The processing module 901 is further configured to: when the first parameter of the beam measurement configuration information is configured to be enabled, determine that the first beam and the second beam need to meet the first relationship; and the processing module 901 is further configured to: when the first parameter of the beam measurement configuration information is configured to be disabled, determine that the first beam and the second beam do not need to meet the first relationship, where the first parameter is used to configure whether to perform grouping reporting.

In a possible implementation, the processing module 901 is further configured to: use the first beam as a common beam of a TRP corresponding to a first CORESET group, or use the first beam as a transmit beam of one or more of the following: a PDCCH corresponding to a first CORESET group, a PDSCH corresponding to the first CORESET group, a PUCCH corresponding to the first CORESET group, and a physical uplink shared channel PUSCH corresponding to the first CORESET group. Some or all quasi co-location QCL resources corresponding to the first CORESET group form the first set of beam failure detection resources, or any CORESET in the first CORESET group has a QCL relationship with a beam failure detection resource in the first set of beam failure detection resources.

In a possible implementation, the transceiver module 902 is further configured to send terminal capability information to the network device, where the terminal capability information includes one or more of the following: information that the terminal device supports the TRP-level beam failure recovery, information that the terminal device supports configuration of a plurality of sets of beam failure detection resources, information about a quantity of sets of beam failure detection resources of which the terminal device supports configuration, information about a quantity of beam failure detection resources in a single set of beam failure detection resources, information that the terminal device supports configuration of a plurality of sets of candidate beam resources, information about a quantity of sets of candidate beam resources of which the terminal device supports configuration, or information about a quantity of candidate beam resources in a single set of candidate beam resources.

All related content of the steps in the foregoing method embodiments may be cited in function descriptions of the corresponding functional modules. Details are not described herein again.

In this application, the terminal device 90 is presented in a form of functional modules obtained through division in an integrated manner. The "module" herein may be an application-specific integrated circuit (ASIC), a circuit, a processor and a memory that execute one or more software or firmware programs, an integrated logic circuit, and/or another device that can provide the foregoing functions.

In some embodiments, in terms of hardware implementation, a person skilled in the art may figure out that the terminal device 90 may be in a form of the terminal device 40 shown in FIG. 5.

In an example, a function/implementation process of the processing module 901 in FIG. 9 may be implemented by the processor 401 in the terminal device 40 shown in FIG. 5 by invoking computer-executable instructions stored in the memory 402. A function/implementation process of the transceiver module 902 in FIG. 9 may be implemented by using the transceiver 403 in the terminal device 40 shown in FIG. 5.

In some embodiments, when the terminal device 90 in FIG. 9 is a chip or a chip system, a function/implementation process of the transceiver module 902 may be implemented by using an input/output interface (or a communication interface) of the chip or the chip system. A function/implementation process of the processing module 901 may be implemented by using a processor (or a processing circuit) of the chip or the chip system.

The terminal device 90 provided in this embodiment may perform the beam failure recovery method. Therefore, for technical effects that can be achieved by the terminal device 90, refer to the foregoing method embodiments. Details are not described herein again.

Figure 10:
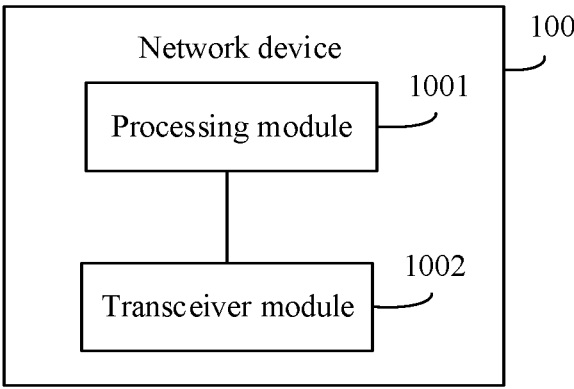
FIG. 10 is a schematic diagram of a structure of another network device according to this application.

In an implementation scenario, for example, the communication apparatus is the network device in the foregoing method embodiment. FIG. 10 is a schematic diagram of a structure of a network device 100. The network device 100 includes a processing module 1001 and a transceiver module 1002.

In some embodiments, the network device 100 may further include a storage module (not shown in FIG. 10), configured to store program instructions and data.

In some embodiments, the transceiver module 1002 may also be referred to as a transceiver unit, and is configured to implement a sending function and/or a receiving function. The transceiver module 1002 may include a transceiver circuit, a transceiver machine, a transceiver, or a communication interface.

In some embodiments, the transceiver module 1002 may include a receiving module and a sending module, respectively configured to perform receiving and sending steps performed by the network device in the foregoing method embodiments, and/or another process configured to support the technology described in this specification. The processing module 1001 may be configured to perform processing (for example, determining and obtaining) steps performed by the network device in the foregoing method embodiments, and/or another process configured to support the technology described in this specification.

In an example, the processing module 1001 is configured to generate first configuration information, where the first configuration information is used to configure N sets of beam failure detection resources and N sets of candidate beam resources, and N is a positive integer greater than 1. The transceiver module 1002 is configured to send the first configuration information to the terminal device.

In a possible implementation, the transceiver module 1002 is further configured to receive first indication information from the terminal device, where the first indication information indicates a first beam corresponding to a first candidate beam resource, and the first candidate beam resource is a candidate beam resource whose quality is greater than the second threshold in the candidate beam resources included in the N sets of candidate beam resources configured in the first configuration information.

In a possible implementation, the transceiver module 1002 is further configured to send second configuration information to the terminal device. The transceiver module 1002 is further configured to receive first indication information from the terminal device, where the first indication information indicates a first beam corresponding to the first candidate beam resource, and the first candidate beam resource is a candidate beam resource whose quality is greater than the second threshold in candidate beam resources included in one set of candidate beam resources or N sets of candidate beam resources.

In a possible implementation, the transceiver module 1002 is further configured to receive first indication information from the terminal device, where the first indication information indicates a first beam corresponding to a first candidate beam resource, and the first candidate beam resource is a candidate beam resource whose quality is greater than a second threshold in a first set of candidate beam resources, where the set of candidate beam resources is a set of candidate beam resources that is associated with the first set of beam failure detection resources in the N sets of candidate beam resources, and the first set of beam failure detection resources is one of the N sets of beam failure detection resources.

In a possible implementation, the transceiver module 1002 is further configured to receive second indication information from the terminal device, where the second indication information indicates whether the first beam and a second beam meet the first relationship.

In a possible implementation, the transceiver module 1002 is further configured to receive third indication information from the terminal device, where the third indication information indicates information about the second beam that meets the first relationship with the first beam.

In a possible implementation, the transceiver module 1002 is further configured to receive terminal capability information from the terminal device, where the terminal capability information includes one or more of the following: information that the terminal device supports the TRP-level beam failure recovery, information that the terminal device supports configuration of a plurality of sets of beam failure detection resources, information about a quantity of sets of beam failure detection resources of which the terminal device supports configuration, information about a quantity of beam failure detection resources in a single set of beam failure detection resources, information that the terminal device supports configuration of a plurality of sets of candidate beam resources, information about a quantity of sets of candidate beam resources of which the terminal device supports configuration, or information about a quantity of candidate beam resources in a single set of candidate beam resources.

All related content of the steps in the foregoing method embodiments may be cited in function descriptions of the corresponding functional modules. Details are not described herein again.

In this application, the network device 100 is presented in a form of functional modules obtained through division in an integrated manner. The "module" herein may be an application-specific integrated circuit (ASIC), a circuit, a processor and a memory that execute one or more software or firmware programs, an integrated logic circuit, and/or another device that can provide the foregoing functions.

In some embodiments, in terms of hardware implementation, a person skilled in the art may figure out that the network device 100 may be in a form of the network device 30 shown in

FIG. 5.

In an example, a function/implementation process of the processing module 1001 in FIG. 10 may be implemented by the processor 301 in the network device 30 shown in FIG. 5 by invoking the computer-executable instructions stored in the memory 302. A function/implementation process of the transceiver module 1002 in FIG. 10 may be implemented by using the transceiver 303 in the network device 30 shown in FIG. 5.

In some embodiments, when the network device 100 in FIG. 10 is a chip or a chip system, a function/implementation process of the transceiver module 1002 may be implemented by using an input/output interface (or a communication interface) of the chip or the chip system.

A function/implementation process of the processing module 1001 may be implemented by a processor (or a processing circuit) of a chip or a chip system.

The network device 100 provided in this embodiment may perform the beam failure recovery method. Therefore, for technical effects that can be achieved by the network device 100, refer to the foregoing method embodiments. Details are not described herein again.

In a possible product form, the terminal device or the network device in embodiment of this application may be further implemented by using one or more field programmable gate arrays (FPGA), a programmable logic device (PLD), a controller, a state machine, gate logic, a discrete hardware component, any other suitable circuitry, or any combination of circuitry capable of performing the various functions described throughout this application.

In some embodiments, an embodiment of this application further provides a communication apparatus. The communication apparatus includes a processor, configured to implement the method in any one of the foregoing method embodiments.

In a possible implementation, the communication apparatus further includes a memory. The memory is configured to store necessary program instructions and necessary data. The processor may invoke program code stored in the memory, to indicate the communication apparatus to perform the method in any one of the foregoing method embodiments. Certainly, the communication apparatus may not include a memory.

In another possible implementation, the communication apparatus further includes an interface circuit. The interface circuit is a code/data read/write interface circuit, and the interface circuit is configured to receive computer-executable instructions (where the computer-executable instructions are stored in a memory, and may be directly read from the memory, or may be read via another component) and transmit the computer-executable instructions to the processor.

In still another possible implementation, the communication apparatus further includes a communication interface, and the communication interface is configured to communicate with a module other than the communication apparatus.

It may be understood that the communication apparatus may be a chip or a chip system. When the communication apparatus is a chip system, the communication apparatus may include a chip, or may include a chip and another discrete component. This is not specifically limited in this embodiment of this application.

In some embodiments, an embodiment of this application further provides a communication apparatus (for example, the communication apparatus may be a chip or a chip system). The communication apparatus includes an interface circuit and a logic circuit, and the interface circuit is configured to obtain input information and/or output information. The logic circuit is configured to perform the method in any one of the foregoing method embodiments, to process and/or generate the output information based on the input information.

When the communication apparatus is used to implement the function of the terminal device in the foregoing method embodiments, the input information may be the following information.

In a possible implementation, the input information may be first configuration information, and the first configuration information is used to configure the N sets of beam failure detection resources and the N sets of candidate beam resources. Correspondingly, performing processing based on the input information may be: performing cell-level beam failure recovery or TRP-level beam failure recovery based on the first configuration information.

In a possible implementation, the output information may be first indication information, and the first indication information indicates a beam corresponding to a first candidate beam resource.

In a possible implementation, the output information may be second indication information, and the second indication information indicates whether a first beam and a second beam meet a first relationship.

In a possible implementation, the output information may be third indication information, and the third indication information indicates information about a second beam that meets the first relationship with the first beam.

In a possible implementation, the output information may be terminal capability information, and the terminal capability information includes one or more of the following: information that the terminal device supports the TRP-level beam failure recovery, information that the terminal device supports configuration of a plurality of sets of beam failure detection resources, information about a quantity of sets of beam failure detection resources of which the terminal device supports configuration, information about a quantity of beam failure detection resources in a single set of beam failure detection resources, information that the terminal device supports configuration of a plurality of sets of candidate beam resources, information about a quantity of sets of candidate beam resources of which the terminal device supports configuration, or information about a quantity of candidate beam resources in a single set of candidate beam resources.

The communication apparatus provided in this embodiment may perform the method in the foregoing method embodiments. Therefore, for technical effects that can be achieved by the communication apparatus, refer to the foregoing method embodiments. Details are not described herein again.

In a possible product form, the terminal device described in this embodiment of this application may be implemented by a general bus architecture.

Figure 11:
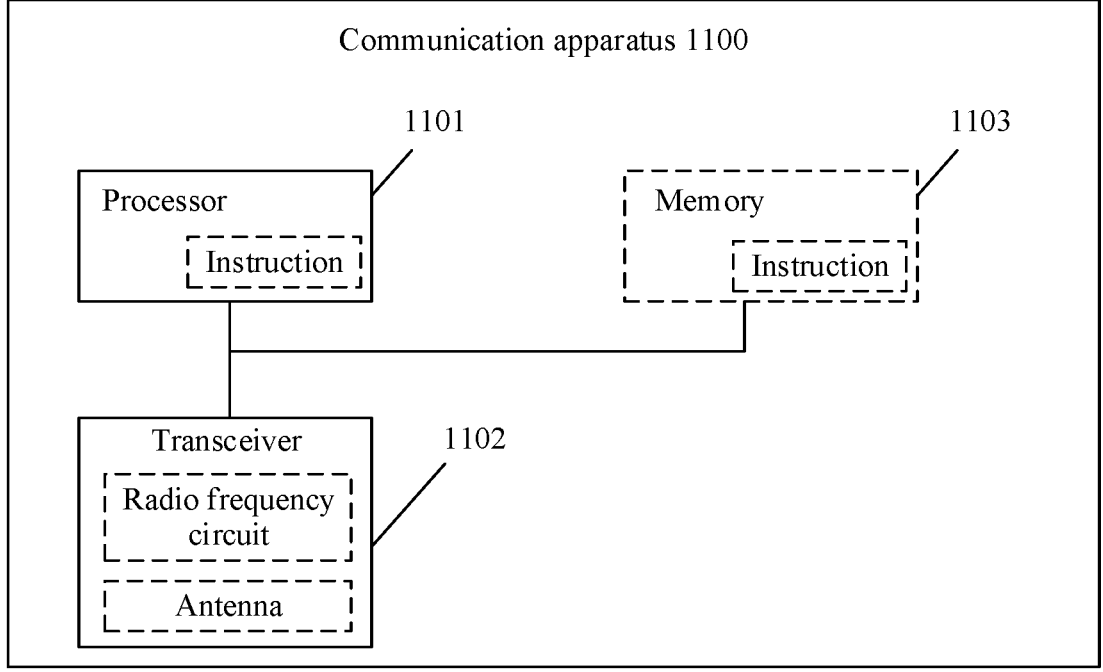
FIG. 11 is a schematic diagram of a structure of a communication apparatus according to this application.

For ease of description, FIG. 11 is a schematic diagram of a structure of a communication apparatus 1100 according to an embodiment of this application. The communication apparatus 1100 includes a processor 1101 and a transceiver 1102. The communication apparatus 1100 may be a terminal device or a chip in a terminal device. FIG. 11 shows only main components of the communication apparatus 1100. In addition to a processor 1101 and a transceiver 1102, the communication apparatus may further include a memory 1103 and an input/output apparatus (not shown in the figure).

The processor 1101 is mainly configured to: process a communication protocol and communication data, control the entire communication apparatus, execute a software program, and process data of the software program. The memory 1103 is mainly configured to store the software program and the data. The transceiver 1102 may include a radio frequency circuit and an antenna. The radio frequency circuit is mainly configured to perform conversion between a baseband signal and a radio frequency signal and process a radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user.

The processor 1101, the transceiver 1102, and the memory 1103 may be connected through a communication bus.

After the communication apparatus is powered on, the processor 1101 may read the software program in the memory 1103, interpret and execute instructions of the software program, and process data of the software program. When data needs to be sent wirelessly, the processor 1101 performs baseband processing on the to-be-sent data, and then outputs a baseband signal to a radio frequency circuit. The radio frequency circuit performs radio frequency processing on the baseband signal, and then sends, over the antenna, a radio frequency signal in an electromagnetic wave form. When data is sent to the communication apparatus, the radio frequency circuit receives a radio frequency signal through the antenna, converts the radio frequency signal into a baseband signal, and outputs the baseband signal to the processor 1101. The processor 1101 converts the baseband signal into data, and processes the data.

In another implementation, the radio frequency circuit and the antenna may be disposed independent of the processor that performs baseband processing. For example, in a distributed scenario, the radio frequency circuit and the antenna may be disposed remotely and independent of the communication apparatus.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on the computer, the processes or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like. In embodiments of this application, the computer may include the apparatus described above.

Although this application is described with reference to embodiments, in a process of implementing this application that claims protection, a person skilled in the art may understand and implement another variation of the disclosed embodiments by viewing the accompanying drawings, disclosed content, and appended claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A beam failure recovery method, applied to a terminal device, the method comprising:

receiving first configuration information from a network device, wherein the first configuration information is used to configure N sets of beam failure detection resources and N sets of candidate beam resources, and N is a positive integer greater than 1, wherein the first configuration information comprises N control resource set (CORESET) groups, and each of the N CORESET groups is separately for determining one set of beam failure detection resources in the N sets of beam failure detection resources, wherein the N CORESET groups comprise a third CORESET group, quasi co-location (QCL) resources of K CORESETs in the third CORESET group form a third set of beam failure detection resources in the N sets of beam failure detection resources, and K is a positive integer; and performing cell-level beam failure recovery or transmission reception point (TRP)-level beam failure recovery based on the first configuration information.

2. The method of claim 1, wherein the performing cell-level beam failure recovery based on the first configuration information comprises:

when quality of all beam failure detection resources in the N sets of beam failure detection resources is less than a first threshold, sending first indication information to the network device, wherein the first indication information indicates a first beam corresponding to a first candidate beam resource, and the first candidate beam resource is a candidate beam resource included in the N sets of candidate beam resources and has quality greater than a second threshold.

3. The method of claim 1, the method further comprising:

receiving second configuration information from the network device, wherein the second configuration information is used to configure one set of beam failure detection resources and one set of candidate beam resources; and the performing cell-level beam failure recovery based on the first configuration information comprises:

when quality of all beam failure detection resources in the one set of beam failure detection resources and the N sets of beam failure detection resources is less than a first threshold, sending first indication information to the network device, wherein the first indication information indicates a first beam corresponding to a first candidate beam resource, and the first candidate beam resource is a candidate beam resource in the one set of candidate beam resources or the N sets of candidate beam resources and has quality greater than a second threshold.

4. The method of claim 1, wherein the performing TRP-level beam failure recovery based on the first configuration information comprises:

when quality of all beam failure detection resources in a first set of beam failure detection resources is less than a first threshold, sending first indication information to the network device, wherein the first indication information indicates a first beam corresponding to a first candidate beam resource, and the first candidate beam resource is a candidate beam resource in a first set of candidate beam resources and has quality greater than a second threshold, wherein the first set of beam failure detection resources is one of the N sets of beam failure detection resources, and the first set of candidate beam resources is associated with the first set of beam failure detection resources in the N sets of candidate beam resources.

5. The method of claim 4, wherein the sending first indication information to the network device comprises:

sending a scheduling request (SR) to the network device over a first transmit beam of N transmit beams on a first physical uplink control channel (PUCCH), wherein the SR is used to request the network device to schedule an uplink transmission resource, and the first transmit beam is associated with a second set of beam failure detection resources, a second set of candidate beam resources, or a fourth CORESET group; and sending a medium access control-control element (MAC CE) to the network device on the uplink transmission resource, wherein the MAC CE comprises the first indication information, wherein the second set of beam failure detection resources is different from the first set of beam failure detection resources in the N sets of beam failure detection resources, the second set of candidate beam resources is associated with the second set of beam failure detection resources, and the fourth CORESET group corresponds to the second set of beam failure detection resources.

6. The method of claim 2, the method further comprising:

sending, by a layer-1 entity of the terminal device, beam failure indication information to an upper-layer entity of the terminal device, wherein the beam failure indication information comprises at least one of information about a set of beam failure detection resources in which a beam failure occurs or a beam failure type, wherein the beam failure type comprises a cell-level beam failure or a TRP-level beam failure, wherein quality of all beam failure detection resources in the set of beam failure detection resources in which the beam failure occurs is less than the first threshold.

7. The method of claim 4, the method further comprising:

sending second indication information or third indication information to the network device, wherein the second indication information indicates whether the first beam and a second beam meet a first relationship, wherein the third indication information indicates information about the second beam that meets the first relationship with the first beam.

8. The method of claim 4, the method further comprising:

determining, based on third configuration information, whether the first beam and a second beam need to meet a first relationship, wherein the third configuration information comprises one or more of the following:

relationship configuration information, multi-TRP transmission mode configuration information, or beam measurement configuration information, and wherein the relationship configuration information indicates whether the first beam and the second beam need to meet the first relationship.

9. The method of claim 8, wherein the third configuration information is the multi-TRP transmission mode configuration information; and the determining, based on the multi-TRP transmission mode configuration information, whether the first beam and the second beam need to meet the first relationship comprises:

when a transmission mode configured in the multi-TRP transmission mode configuration information is a frequency division multiplexing (FDM) mode, determining that the first beam and the second beam need to meet the first relationship; or when a transmission mode configured in the multi-TRP transmission mode configuration information is not a frequency division multiplexing (FDM) mode, determining that the first beam and the second beam do not need to meet the first relationship.

10. The method of claim 8, wherein the third configuration information is the relationship configuration information; and the determining, based on the relationship configuration information, whether the first beam and the second beam need to meet the first relationship comprises:

when the relationship configuration information indicates that the first beam and the second beam need to meet the first relationship, determining that the first beam and the second beam need to meet the first relationship; or when the relationship configuration information indicates that the first beam and the second beam do not meet the first relationship, determining that the first beam and the second beam do not need to meet the first relationship.

11. The method of claim 8, wherein the third configuration information is the beam measurement configuration information; and the determining, based on the beam measurement configuration information, whether the first beam and the second beam need to meet the first relationship comprises:

when a first parameter of the beam measurement configuration information is configured to be enabled, determining that the first beam and the second beam need to meet the first relationship; or when a first parameter of the beam measurement configuration information is configured to be disabled, determining that the first beam and the second beam do not need to meet the first relationship, wherein the first parameter is used to configure whether to perform grouping reporting.

12. The method of claim 7, wherein the first relationship comprises:

the first beam and the second beam can be simultaneously received by the terminal device;

receive beams corresponding to the first beam and the second beam are the same; or receive antenna panels corresponding to the first beam and the second beam are different.

13. The method of claim 7, wherein the second beam is a beam corresponding to one or more beam failure detection resources in the second set of beam failure detection resources;

the second beam is a physical downlink control channel (PDCCH) transmit beam corresponding to a second CORESET group, and the second CORESET group corresponds to the second set of beam failure detection resources;

the second beam is a physical downlink shared channel (PDSCH) transmit beam of a TRP corresponding to the second set of beam failure detection resources; or the second beam is a common beam of a TRP corresponding to the second set of beam failure detection resources, wherein the second set of beam failure detection resources is a set of beam failure detection resources that is different from the first set of beam failure detection resources in the N sets of beam failure detection resources.

14. The method of claim 4, the method further comprising:

using the first beam as a common beam of a TRP corresponding to a first CORESET group, or using the first beam as a transmit beam of one or more of the following: a physical downlink control channel (PDCCH) corresponding to the first CORESET group, a physical downlink shared channel (PDSCH) corresponding to the first CORESET group, a physical uplink control channel (PUCCH) corresponding to the first CORESET group, and a physical uplink shared channel (PUSCH) corresponding to the first CORESET group, wherein a part of or all quasi co-location (QCL) resources corresponding to the first CORESET group form the first set of beam failure detection resources, or there is a QCL relationship between any CORESET in the first CORE-SET group and a beam failure detection resource in the first set of beam failure detection resources.

15. The method of claim 1, wherein the first configuration information comprises the N sets of beam failure detection resources; wherein a quantity of beam failure detection resources included in each of the N sets of beam failure detection resources does not exceed M, or a total quantity of beam failure detection resources included in the N sets of beam failure detection resources does not exceed P; and M and P are positive integers.

16. The method of claim 15, wherein a value of N is 2, a value of M is 1 or 2, and a value of P is one of 2, 3, or 4.

17. The method of claim 1, the method further comprising:

sending terminal capability information to the network device, wherein the terminal capability information comprises one or more of the following:

information that the terminal device supports the TRP-level beam failure recovery, information that the terminal device supports configuration of a plurality of sets of beam failure detection resources, information about a quantity of sets of beam failure detection resources of which the terminal device supports configuration, information about a quantity of beam failure detection resources in a single set of beam failure detection resources, information that the terminal device supports configuration of a plurality of sets of candidate beam resource, information about a quantity of sets of candidate beam resource of which the terminal device supports configuration, or information about a quantity of candidate beam resources in a single set of candidate beam resources.

18. An apparatus, comprising:

a processor, and a non-transitory memory coupled to the processor and configured to store program instructions that, when executed by the processor, cause the apparatus to perform:

receiving first configuration information from a network device, wherein the first configuration information is used to configure N sets of beam failure detection resources and N sets of candidate beam resources, and N is a positive integer greater than 1, wherein the first configuration information comprises N control resource set (CORESET) groups, and each of the N CORESET groups is separately for determining one set of beam failure detection resources in the N sets of beam failure detection resources, wherein the N CORESET groups comprise a third CORESET group, quasi co-location (QCL) resources of K CORESETs in the third CORESET group form a third set of beam failure detection resources in the N sets of beam failure detection resources, and K is a positive integer; and performing cell-level beam failure recovery or transmission reception point (TRP)-level beam failure recovery based on the first configuration information.

19. A non-transitory computer-readable medium having stored thereon computer-readable instructions that, when executed by a processor, cause the processor to execute a method comprising:

receiving first configuration information from a network device, wherein the first configuration information is used to configure N sets of beam failure detection resources and N sets of candidate beam resources, and N is a positive integer greater than 1, wherein the first configuration information comprises N control resource set (CORESET) groups, and each of the N CORESET groups is separately for determining one set of beam failure detection resources in the N sets of beam failure detection resources, wherein the N CORESET groups comprise a third CORESET group, quasi co-location (QCL) resources of K CORESETs in the third CORESET group form a third set of beam failure detection resources in the N sets of beam failure detection resources, and K is a positive integer; and performing cell-level beam failure recovery or transmission reception point (TRP)-level beam failure recovery based on the first configuration information.

* * * * *